(12) United States Patent
Trikha et al.

(10) Patent No.: US 10,317,101 B2
(45) Date of Patent: Jun. 11, 2019

(54) HVAC DEVICE CONTROLLER WITH NETWORK INTEGRATION CAPABILITIES

(71) Applicant: Johnson Controls Technology Company, Plymouth, MI (US)

(72) Inventors: Dinesh Trikha, Shorewood, WI (US); Abu Bakr Khan, Franklin, WI (US); Donald Gottschalk, Racine, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 107 days.

(21) Appl. No.: 15/336,749

(22) Filed: Oct. 27, 2016

(65) Prior Publication Data

US 2018/0119972 A1   May 3, 2018

(51) Int. Cl.
| | |
|---|---|
| *G06F 19/00* | (2018.01) |
| *F24F 11/30* | (2018.01) |
| *F24F 11/62* | (2018.01) |
| *G05B 19/042* | (2006.01) |
| *H04L 12/28* | (2006.01) |
| *H04W 84/12* | (2009.01) |

(Continued)

(52) U.S. Cl.
CPC .............. *F24F 11/30* (2018.01); *F24F 11/62* (2018.01); *G05B 19/042* (2013.01); *H04L 12/283* (2013.01); *H04L 12/2816* (2013.01); *H04L 12/2836* (2013.01); *H04W 84/12* (2013.01); *H04W 92/04* (2013.01); *F24F 11/58* (2018.01); *F24F 11/63* (2018.01); *G05B 2219/2614* (2013.01)

(58) Field of Classification Search
CPC combination set(s) only.
See application file for complete search history.

(56) References Cited

U.S. PATENT DOCUMENTS

| | | | |
|---|---|---|---|
| 2004/0260431 A1* | 12/2004 | Keenan, Jr. ............ | G05B 15/02 700/295 |
| 2006/0067209 A1 | 3/2006 | Sheehan et al. | |

(Continued)

OTHER PUBLICATIONS

International Search Report and Written Opinion on International Application No. PCT/US2017/056872 dated Jan. 10, 2018. 114 pages.

(Continued)

*Primary Examiner* — Kidest Bahta
(74) *Attorney, Agent, or Firm* — Foley & Lardner LLP

(57) ABSTRACT

A building management system network interface device including a processing circuit, which includes a device interface and a network interface. The device interface is configured to provide a serial communication link between the network interface device and an HVAC device. The network interface is configured to communicate with an external network, and to receive data values from the processing circuit. The device interface is configured to populate one or more attributes of an equipment object with the data values. The network interface is configured to map the attributes of the equipment object to individual data objects, and to write the attributes to the mapped individual data objects. The processing circuit is further configured to execute control logic to control the operation of the HVAC device based in part on the data received from the device and one or more commands received from the external network.

20 Claims, 18 Drawing Sheets

(51) Int. Cl.
*H04W 92/04* (2009.01)
*F24F 11/63* (2018.01)
*F24F 11/58* (2018.01)

(56) References Cited

U.S. PATENT DOCUMENTS

| | | | | |
|---|---|---|---|---|
| 2007/0055759 A1* | 3/2007 | McCoy | | G05B 19/042 |
| | | | | 709/223 |
| 2007/0244573 A1* | 10/2007 | McFarland | | H04W 40/248 |
| | | | | 700/20 |
| 2011/0083094 A1* | 4/2011 | Laycock | | G06F 9/451 |
| | | | | 715/772 |
| 2013/0268127 A1* | 10/2013 | Casilli | | G05D 23/19 |
| | | | | 700/276 |
| 2015/0293508 A1* | 10/2015 | Piaskowski | | G05B 15/02 |
| | | | | 700/275 |
| 2015/0327010 A1 | 11/2015 | Gottschalk et al. | | |

OTHER PUBLICATIONS

U.S. Appl. No. 15/146,678, filed May 4, 2016, Johnson Controls Technology Company.
U.S. Appl. No. 15/207,431, filed Jul. 11, 2016, Johnson Controls Technology Company.

* cited by examiner

HVAC DEVICE CONTROLLER WITH NETWORK INTEGRATION CAPABILITIES

BACKGROUND

The present disclosure relates generally to building management systems and associated devices. The present disclosure relates more particularly to devices, systems and methods for providing a unitary controller and network device for integrating non-networked building management devices onto an existing network to allow for integration of the building management device into the building management system.

A building management system (BMS) is, in general, a system of devices configured to control, monitor, and manage equipment in or around a building or building area. A BMS can include a heating, ventilation, and air conditioning (HVAC) system, a security system, a lighting system, a fire alerting system, another system that is capable of managing building functions or devices, or any combination thereof. BMS devices can be installed in any environment (e.g., an indoor area or an outdoor area) and the environment can include any number of buildings, spaces, zones, rooms, or areas. A BMS can include a variety of devices (e.g., HVAC devices, controllers, chillers, fans, sensors, etc.) configured to facilitate monitoring and controlling the building space. Throughout this disclosure, such devices are referred to as BMS devices or building equipment.

In some existing systems, third party supplied devices can use standalone systems that do not have the means for communicating on the larger BMS network. Either a separate network is provided for the standalone systems, or a user may have to directly interface with the standalone system. For example, common BMS devices such as valves and actuators may not contain the necessary hardware to communicate over the BMS network. Further, larger devices and systems, such as boilers and/or chillers, may contain proprietary communication protocols and networks and not interface with a BMS network. Additionally, these third party devices often require additional real estate within the BMS device as they do not have an ability to also control the BMS device, and therefore must be installed in conjunction with a controller. Thus, it would be desirable to be able to provide an interface to allow for a BMS device to be integrated into an existing BMS network while allowing providing control functionality over the BMS device.

SUMMARY

One implementation of the present disclosure is a building management system network interface device. The device includes a processing circuit which includes a device interface. The device interface is configured to provide a serial communication link between the network interface device and an HVAC device. The processing circuit further include a network interface in communication with the device interface and configured to communicate with an external network. The device interface is further configured to receive data values from the processing circuit, the device interface being configured by the processing circuit to populate one or more attributes of an equipment object stored in the device interface with the data values. The network interface is further configured to map the attributes of the equipment object to individual data objects, and to write the attributes of the equipment object to the mapped individual data objects. The network interface is also configured to communicate the individual data objects to the external network. The processing circuit is further configured to execute control logic to control the operation of the HVAC device based in part on the data received from the device and one or more commands received from the external network.

Another implementation of the present disclosure is a network interface controller for providing network communications and control to an HVAC device. The controller includes a processing circuit including a processor configured to communicate with the HVAC device and to receive one or more data values from the HVAC device. The controller further includes a memory in communication with the processor and including an equipment object, the equipment object comprising one or more attributes associated with the HVAC device. The processing circuit is further configured to map the one or more received data values to the one or more attributes of the equipment object. The processing circuit further includes a network transceiver configured to transmit the mapped values in the equipment object to a network using a communication interface. The processing circuit also includes a control logic module configured to provide control algorithms to the processor for execution, wherein the control algorithms are configured to control one or more variables associated with the HVAC device.

A further implementation of the present disclosure is a method of communicating HVAC device attributes to a network. The method includes receiving one or more data values associated with the HVAC device at a communication circuit via a communication link. The method further includes writing one or more data values to an equipment object, the equipment object mapping the data values to an associated of the equipment object. The method also includes mapping the attributes of the equipment object to one or more data objects. The method further includes wirelessly transmitting the data values stored in the data objects to the network using a Wi-Fi communication link object.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the FIGURES, systems, devices and methods for integrating BMS devices into a BMS network are described, according to various exemplary embodiments. The devices, systems and methods described herein may be used to integrate one or more network devices onto a BMS network such as BACnet. A network interface controller may be used to provide the communication with the BMS device. The network interface controller can include a device interface for interfacing with the BMS device and a network interface for interfacing with a network. The network interface controller may communicate with the host device via a communication interface, such as a universal asynchronous receiver/transmitter. The device interface may have an equipment object which can include all of the desired parameters from the BMS device. Data associated with the BMS device may be provided to the equipment object via the communication interface. The equipment object may allow for the network interface to map standard network objects to the attributes in the equipment object. The network interface controller may further include control logic for controlling the host device.

Building Management System and HVAC System

Figure 1:
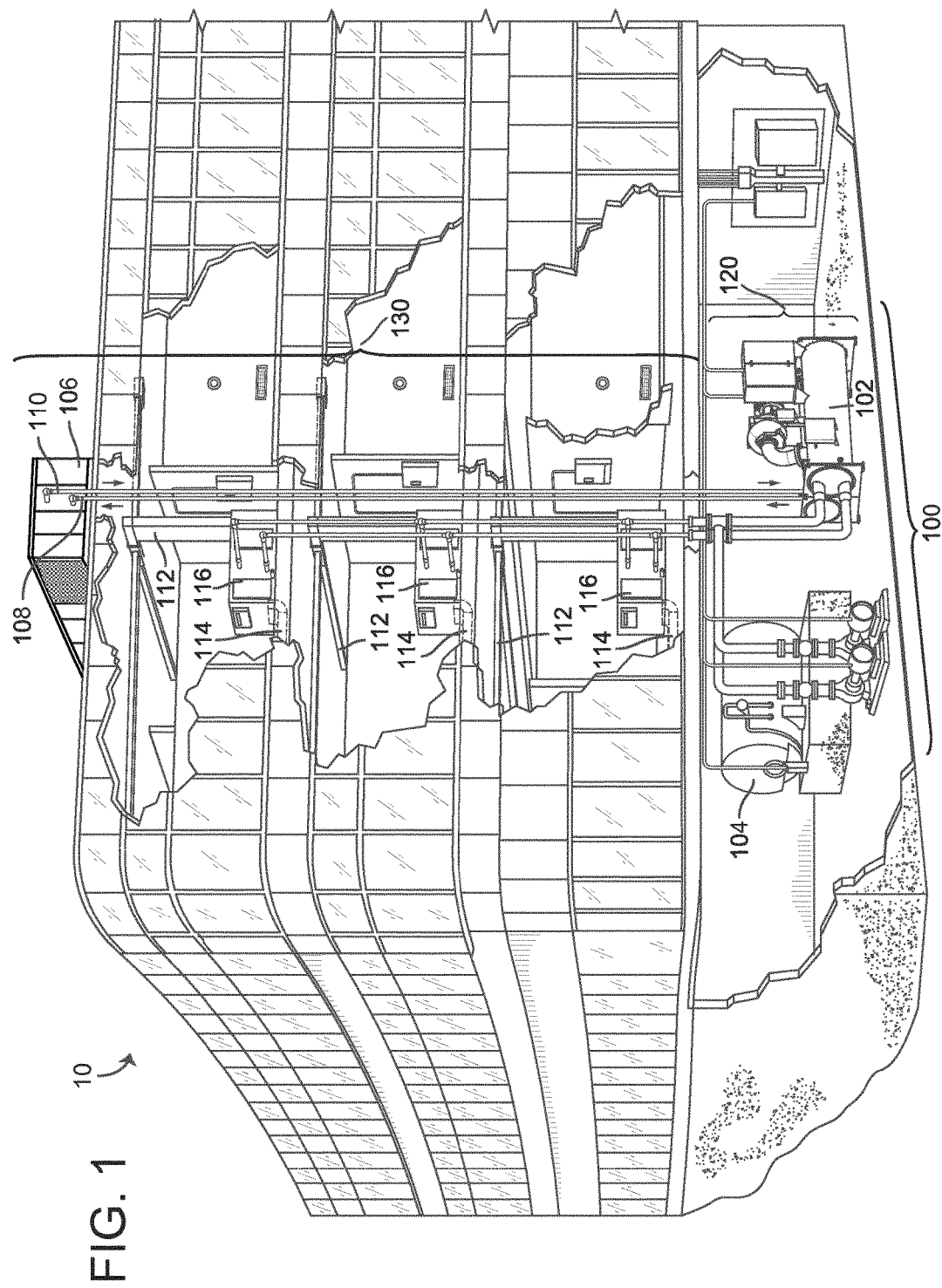
FIG. 1 is a drawing of a building equipped with a HVAC system, according to an exemplary embodiment.

Referring now to FIGS. 1-4, an exemplary building management system (BMS) and HVAC system in which the systems and methods of the present invention may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, an HVAC system, a security system, a lighting system, a fire alerting system, or any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
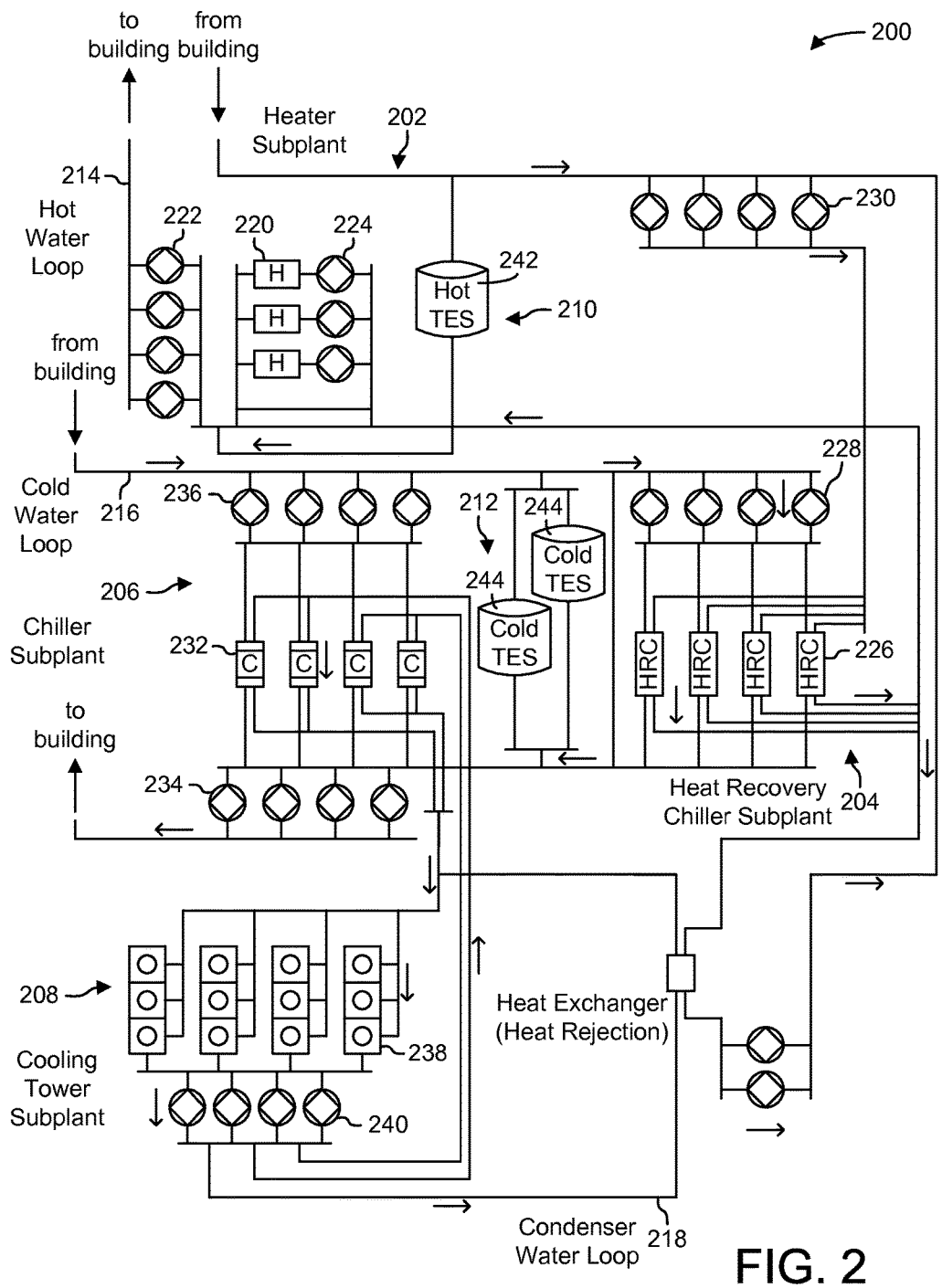
FIG. 2 is a block diagram of a waterside system that may be used in conjunction with the building of FIG. 1, according to an exemplary embodiment.

Referring now to FIG. 2, a block diagram of a waterside system 200 is shown, according to some embodiments. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between the chiller subplant 206 and the building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot IES subplant 210 may also include one or more pumps or valves configured to control the flow rate of the hot water into or out of hot TES tank 242. Cold TES subplant 212 is shown to include cold IES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
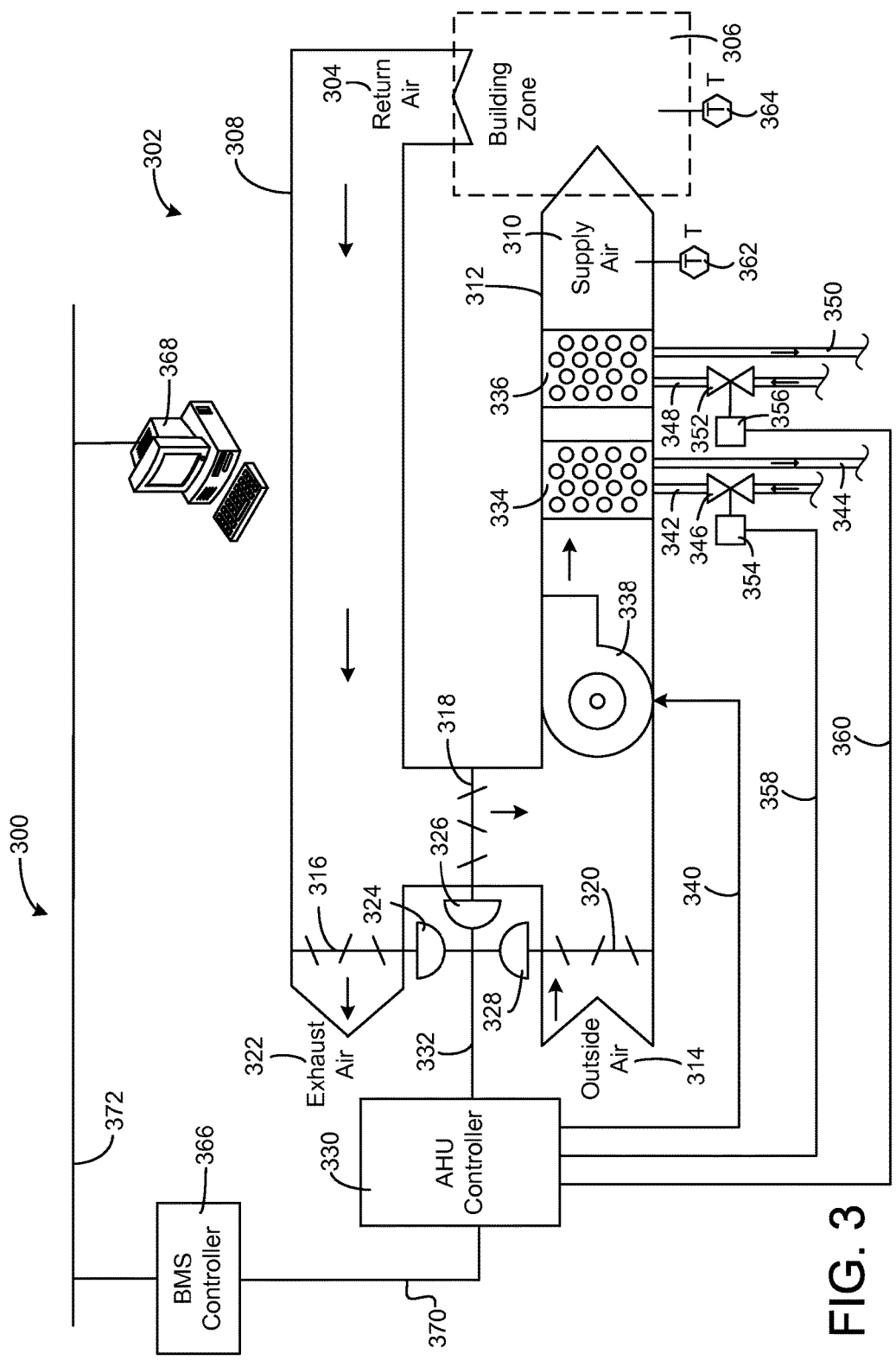
FIG. 3 is a block diagram of an airside system that may be used in conjunction with the building of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
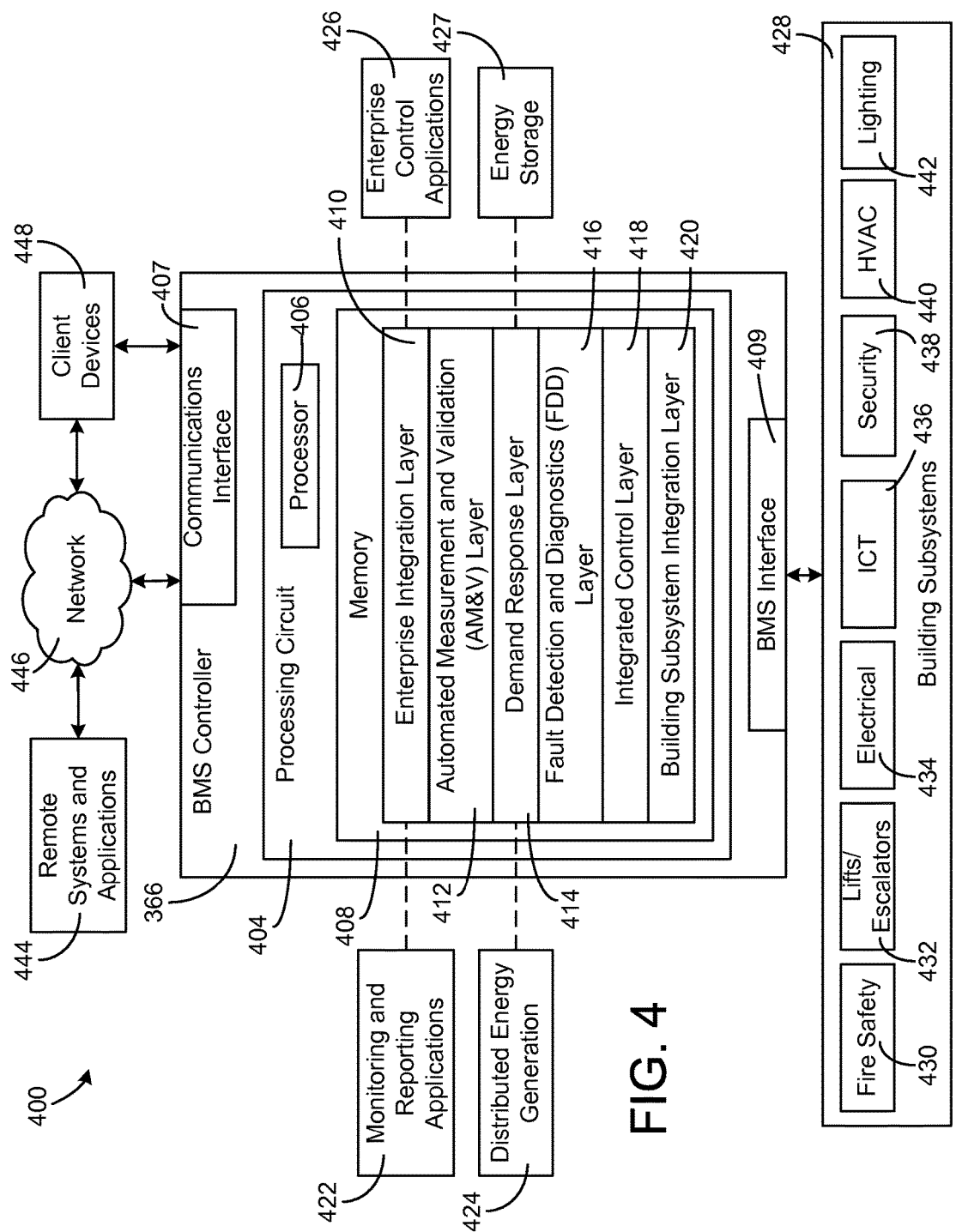
FIG. 4 is a block diagram of a building management system (BMS) that may be used to monitor and/or control the building of FIG. 1, according to an exemplary embodiment.

Referring now to FIG. 4, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold IES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Communications Circuit

Figure 5:
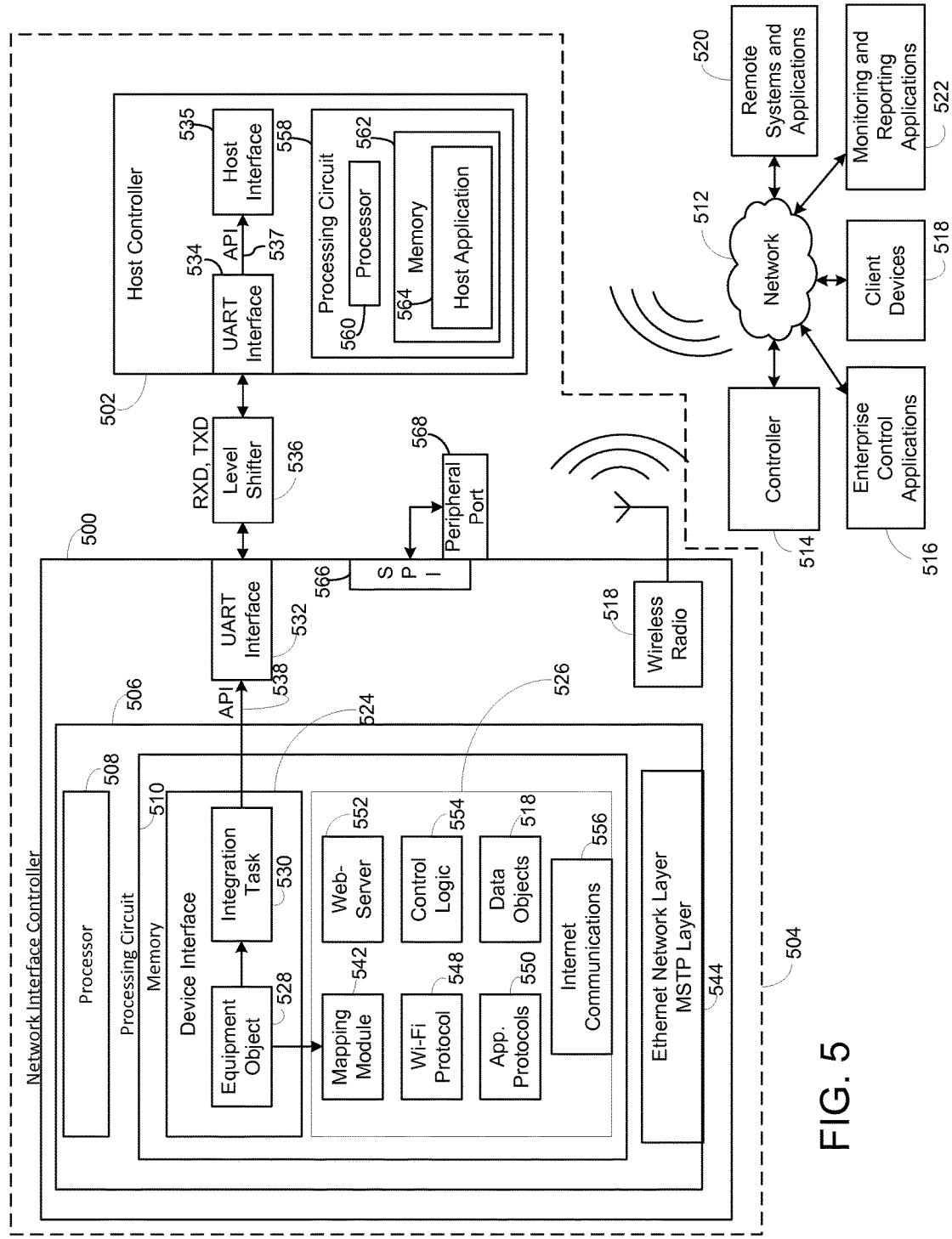
FIG. 5 is a block diagram illustrating a network interface controller in communication with a host device controller, according to some embodiments.

Referring now to FIG. 5, a block diagram illustrating a network interface controller 500 in communication with a host controller 502 is shown, according to some embodiments. In one embodiment, the host controller 502 and the network interface controller 500 are contained within a BMS device 504. The BMS device 504 can be any number of devices, including any of the BMS devices listed above. In one embodiment, the BMS device 504 is an HVAC device, such as a chiller, an actuator, a valve, an AHU, an RTU, a boiler, etc. The host controller 502 may be a proprietary device specific to the BMS device 504, and used to control the BMS device 504. As shown in FIG. 5, both the network interface controller 500 and the host controller 502 are located within the BMS device 504. In some embodiments, the network interface controller 500 is an integrated circuit, chip, or microcontroller unit (MCU) separate from a processing circuit 558 of the host controller 502, and configured to bridge communications between the host controller 502 and other external systems or devices. In other embodiments, the network interface controller 500 is a separate circuit board (daughter board) containing the required circuitry, located within the BMS device 504, and in communication with the host controller 502. In a further embodiment, the network interface controller 500 is a separate device coupled to the BMS device 504, and in communication with the host controller 502. This may allow for a network interface controller 500 to be installed on a BMS device 504 to allow for a BMS device 504 without network connectivity to be easily converted to communicate via a BMS network, such as BACnet.

The network interface controller 500 can include a processing circuit 506. The processing circuit 506 can include a processor 508 and a memory 510. The processor 508 may be a general purpose or specific purpose processor, an application specific integrated circuit (ASIC), one or more field programmable gate arrays (FPGAs), a group of processing components, or other suitable processing components. The processor 508 is configured to execute computer code or instructions stored in the memory 510 or received from other computer readable media (e.g., CDROM, network storage, a remote server, etc.).

The memory 510 may include one or more devices (e.g., memory units, memory devices, storage devices, etc.) for storing data and/or computer code for completing and/or facilitating the various processes described in the present disclosure. The memory 510 may include random access memory (RAM), read-only memory (ROM), hard drive storage, temporary storage, non-volatile memory, flash memory, optical memory, or any other suitable memory for storing software objects and/or computer instructions. The memory 510 may include database components, object code components, script components, or any other type of information structure for supporting the various activities and information structures described in the present disclosure. The memory 510 may be communicably connected to the processor 508 via the processing circuit 506 and may include computer code for executing (e.g., by the processor) one or more processes described herein. When the processor 508 executes instructions stored in the memory 510, the processor 508 generally configures the network interface device 500 (and more particularly the processing circuit 506) to complete such activities.

The network interface controller 500 can be configured to support a variety of data communications between the host controller 502 and other external systems or devices via a network 512. As illustrated in FIG. 5, other systems or devices can include controllers 514, enterprise control applications 516, client devices 518, remote systems and applications 520 and/or monitoring and reporting applications 522. The network interface controller 500 can utilize a wired or wireless communication link and may use any of a variety of disparate communications protocols (e.g., BACnet, LON, WiFi, Bluetooth, TCP/IP, etc.) to communicate with the network 512 and/or directly to other external systems or devices. In one example, the network interface controller 500 is a system on a chip (SoC) device. In some embodiments, the network interface controller 500 is a single-chip microcontroller unit with built-in wireless connectivity. For example, the network interface controller 500 may be a SIMPLELINK brand microcontroller unit, as sold by Texas Instruments (e.g., model number CC2630, CC3200, or the like). The network interface controller 500 may include both wireless communications components (e.g., a Wi-Fi radio, communications stacks, a Wi-Fi driver, communications protocols, etc.), and data processing components (e.g., a processor, memory, control logic, etc.). This can allow the network interface controller 500 to perform both communications and control functions within the infrastructure of a single monolithic chip, without requiring other communication or control components.

In one embodiment, the network interface controller 500 can be a pre-certified BACnet communication circuit capable of communicating on a building automation and controls network (BACnet) using a master/slave token passing (MSTP) protocol. In other embodiments, the network interface controller 500 can communicate on a BACnet network using an Ethernet stack. The network interface controller 500 can be added to any existing host device 502 with a communication interface, to enable BACnet communication with minimal software and hardware design effort. In other words, network interface controller 500 provides a BACnet interface for the host controller 502.

The network interface controller 500 is shown to include a device interface module 532 and a network and control interface module 534. The device interface module 532 and the network and control interface module 534 can be stored within the memory 510 of the processing circuit 506. In one embodiment, the network and control interface module 534 is a BACnet over Ethernet interface. In other embodiments, the network and control interface module 534 may be a Wi-Fi interface, an MS/TP interface, or other interfaces, as applicable. The device interface module 532 can include an equipment object 528, an integration task (e.g., a JBOC task) 530, and a universal asynchronous receiver/transmitter (UART) interface 532. The UART interface 532 can be configured to communicate with a corresponding host UART interface 534 of the host controller 502 using a UART protocol. In other examples, the UART interfaces 532, 534 can be replaced with serial peripheral interfaces (SPI) or inter-integrated circuit (I2C) interfaces. In some embodiments, a level shifter 537 device may be required to ensure that the signal levels from the host controller 502 are compatible with the UART 524 of the device interface module 532, and vice versa. In one example, the level shifter 537 can be a TCA9406DCTR from Texas Instruments; however, other level shifting devices are contemplated.

The integration task module 530 can be connected to the UART interface 532 via an application-program interface (API) 538 and can be configured to populate the equipment object 528 with values received from the processing circuit 558 via the UART interfaces 532, 534. The communications task module 522 can also read values of the equipment object 528 populated by the network and control interface module 534 and can provide the values to the host controller 502. Similarly, the host UART interface 534 can be connected to a host interface 535 via an API 536 and can be configured to communicate with a host application. In one embodiment, the host controller 502 sets the baud rate to be used for communication between the host controller 502 and the network interface controller 500 using the UART interfaces 532, 534. In a further embodiment, the UART interfaces 532, 534 are configured to operate in a half-duplex mode. When the UART interfaces 532, 534 are configured in a half-duplex mode, one device will be responsible for initiating all commands. In one embodiment, the host controller 502 is configured to communicate using a half-duplex mode wherein the host controller 502 will transmit all commands, and the network interface controller 500 will only transmit a command in response to a command transmitted by the host controller 502. This configuration provides the host controller 502 with total control of the flow of data between the host controller 502 and the network interface controller 500. In other examples, the UART interfaces 532, 534 can be configured to operate in full-duplex mode. In full duplex mode, both the host controller 502 and the network interface controller 500 can both transmit commands to each other, as needed.

The equipment object 528 can be a proprietary equipment object configured to expose host controller 502 data to the network and control interface module 534 as a single object with one or more associated attributes. In one embodiment, the equipment object 528 maps the data received from the host controller 502 into an associated attribute within the equipment object 528. Attributes of the equipment object 528 can be defined by a user (e.g., using a data definition tool) to expose any type of internal host controller 502 data to the network and control interface module 534. In one embodiment, the host controller 502 instructs the network interface controller 500 as to which attributes within the equipment object 528 are to be exposed to the network and control interface module 534. For example, the host controller 502 may provide a master list of attributes to the equipment object 528 during an initial setup. The host controller 502 may then instruct the network interface controller 500 to only expose a subset of attributes of the equipment object 528 from the master list of attributes to the network and control interface module 534. In some embodiments, a user may select which attributes are to be exposed to the network and control interface module 534 during the initial configuration of the BMS device 504. For example, the user may indicate which attributes are to be exposed to the network and control interface module 534 using a configuration tool. In other embodiments, the host controller 502 may automatically determine which attributes are to be exposed to the network and control interface module 534 based on the data type of the attributes. For example, the host controller 502 may instruct the network interface controller 500 not to expose "static" data of the BMS device 504, as described in more detail below.

The network and control interface 526 may read the attributes of the equipment object 528 and map the attributes of the equipment object 528 to one or more data objects, such as data objects 540 via a mapping module 542. In some embodiments, the network and control interface module 534 may only map those attributes that are selected to be exposed to the data objects 540, by the host controller 502. In some embodiments, the data objects 540 are BACnet objects. Example BACnet objects may include: file data objects, including read and/or write file services; device data objects (i.e. BACnet device object data); binary value data objects (e.g. relay output states, switch positions, on/off device status); analog value data objects (e.g. speed, temperature, flow, pressure, etc.), which can include analog value objects with or without priority; and multistate value data objects, which can include multistate value objects with or without priority. Additionally, other data objects 540 may include structured view objects, char string objects, and integer objects. In one embodiment, the network and control interface module 534 can be configured to write the values of the data objects 540 to attributes of the equipment object 528. The attribute values of the equipment object 528 can be communicated to the host controller 502 via the UART interfaces 532, 534 and be used to operate the host controller 502.

Figure 6:
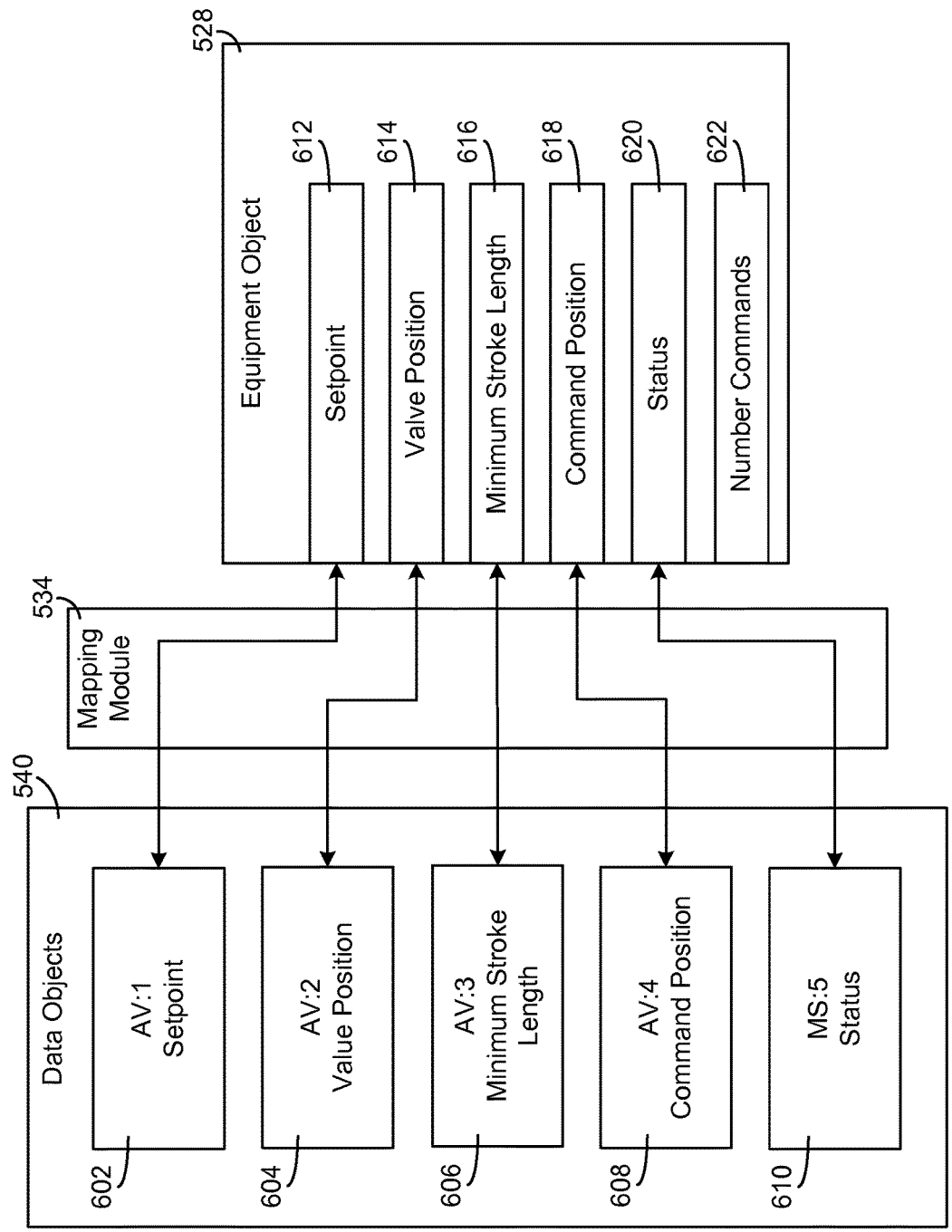
FIG. 6 is a block diagram illustrating a mapping between attributes of an equipment object and one or more data objects, according to some embodiments.

Turning now to FIG. 6, a block diagram illustrating a mapping between attributes of the equipment object 528, and a number of individual data objects 540 is shown, according to some embodiments. In one example, the equipment object 528 and the data objects 540 can be associated with a BMS device, such as a valve. However, the data objects 540 can be associated with any other BMS device type, as described above. As shown in FIG. 6, the network object 540 includes five standard BACnet point objects, including a setpoint object 602, a valve position object 604, a minimum stroke length object 606, a command position object 608, and a status object 610. The setpoint object 602, the valve position object 604, the minimum stroke object 606, and the command position object 608 are shown as analog data objects. The status object 610 is shown as a multistate value data object. The attributes of the equipment object 528 can be defined by a user (e.g., using a data definition tool) and mapped to various types of internal BMS device data. Additionally, the user can define which of the attributes of the equipment object 528 to expose to the network and control interface 526. As shown in FIG. 6, the equipment object 528 is shown to include a setpoint attribute 612, a valve position attribute 614, a minimum stroke length attribute 616, a command position attribute 618, a status attribute 620, and a number commands attribute 622. As further shown in FIG. 6, the equipment object 528 is configured to expose the setpoint attribute 612, the valve position attribute 614, the minimum stroke attribute 616, the command position attribute 618, and the status attribute 620 to the respective data objects 540. Further, the equipment model 528 is configured to not expose the number commands attribute to a corresponding network object 540. An equipment object attribute may not be exposed to keep certain attributes and/or data proprietary. For example, diagnostic data may be kept proprietary and only accessed via authorized commissioning tools. Alternatively, an equipment object attribute may not be exposed where the data is static, as described above. The mapping module 542 may read the attributes of the equipment object 528, and map them to the appropriate data objects 540.

Returning to FIG. 5, the host controller 502 can be configured to interface with the attributes of the equipment object 528 in a more concise fashion than the standard point objects, such as data objects 540. For example, the host controller 502 can read and write various items of internal host controller data to the equipment object 528 as attribute values of the equipment object 528. The equipment object 528 can then expose the values of the attributes to the network and control interface module 534, as described above. The mapping module 542 may then map the values of the exposed attributes to one or more of the BACnet objects 540. In one embodiment, the mapping module 542 evaluates parameters of the attributes of the equipment object 528, such as data type, attribute ID, whether the attribute is modifiable, etc. The mapping module 542 may then map the exposed attribute values of the equipment object 528 to the appropriate data object 540 based on the evaluated parameters. In one embodiment, the mapping module 542 may continuously evaluate the attribute values in the equipment object 528, and thereby continuously map the attribute values to the data objects 540. Alternatively, the equipment object 528 may provide an interrupt signal to the mapping module 542 when an attribute value has been modified. The mapping module 542, receiving the interrupt, may then proceed to evaluate the attribute values in the equipment object 528, and map the attribute values to the data objects 540. In further examples, the mapping module 542 may evaluate the exposed attribute values at predetermined intervals. For example, the mapping module 542 may evaluate the exposed attribute values in one second intervals. However, predetermined intervals of more than one second or less than one second are also contemplated. In some embodiments, the mapping module 542 may further be able to instruct the network and control interface module 534 to generate one or more data objects 540 for one or more exposed attributes within the equipment object 528. For example, once the equipment object 528 has been configured by a user, the mapping module 542 may read the exposed attributes via the network and control interface module 534. For example, the mapping module 542 may read parameters associated with the exposed attributes such as attribute ID's, data types, whether the data is modifiable, object names, etc. The mapping module 542 may then instruct the network and control interface module 534 to generate one or more data object 540 having attributes of the required type (e.g. analog, binary, multistate, etc.) to receive the values associated with the exposed attributes of the equipment object 528.

Once the attributes of the equipment object 528 have been exposed to the network and control interface module 534, an Ethernet/MSTP layer 544 may read the data objects 540. The Ethernet/MSTP layer 544 can be configured to facilitate communications using one or more communication protocols. In other embodiments, the Ethernet/MSTP layer 544 may be configured to facilitate communications using an Ethernet protocol, such as TCP/IP. In one embodiment, the Ethernet/MSTP layer 544 may be configured to facilitate communications using the MSTP master protocol. For example, the Ethernet/MSTP layer 544 can be configured to transmit and receive segmented messages. In some embodiments, the Ethernet/MSTP layer 544 may only transmit segmented messages to devices that subscribe to the BMS device 504 via a BACnet Subscription Service. In other embodiments, the Ethernet/MSTP layer 544 may make the data values contained in the data objects 540 available to other devices or systems via the network 512. The Ethernet/MSTP layer 544 can further be configured to automatically determine a baud rate. In other examples, the baud rate can be manually specified in the Ethernet/MSTP layer 544. In one embodiment, the Ethernet/MSTP layer 544 is capable of operating at the following baud rates: 9600, 19200, 38400, and 76800. However, higher bit rates, such as multiple Mb/sec or even Gb/sec are also contemplated. The Ethernet/MSTP layer 544 may further support duplicate address avoidance by keeping a second device with a duplicate address from interfering with existing traffic. In one embodiment, the Ethernet/MSTP layer 544 supports the maximum MSTP Application Protocol Data Unit (APDU) size of 480 bytes. The Ethernet/MSTP layer 544 may allow for the transmission/reception of change of value (COV) command flags. In one embodiment, the Ethernet/MSTP layer 544 can accept and/or generate data packets bundling multiple COV's into a single message. While FIG. 5 illustrates an Ethernet/MSTP layer, it is contemplated that other communication layers may be used in the network and control interface module 534.

In one embodiment the Ethernet/MSTP layer 544 reads the data objects 540, and transmits the values associated with the data objects 540 to the network 512, via the wireless radio 546 using one or more communication protocols, as described above. In one embodiment, the wireless radio 546 utilizes a Wi-Fi (802.11x) protocol. Other wireless protocols such as Bluetooth, Near Field Communication (NFC), LoRa RF, Cellular (3G, 4G, LTE, CDMA, etc.), Zigbee, etc. may also be used to communicate between the interface circuit 500 and the network 512. In some examples, the network and control interface module 534 may include a wired interface, such as an Ethernet connections (CAT5, CAT6, etc.), a serial connection (RS-232, RS-485), or other applicable wired communication interfaces.

In one embodiment, the network 512 is a cloud-based (i.e. hosted) server. The cloud-based server may allow for devices to access the network 512 via a connection to the internet. For example, one or more of the controller 514, the enterprise control applications 516, the client devices 518, the remote systems and applications 520, and the monitoring and reporting applications 520 may access the network 512 via an internet connection. Additionally, the interface network controller 500 can communicate with the cloud based network 512, to allow for cloud-based connectivity. For example, the wireless radio 546 may allow the network interface device 500 to interface with one or more internet access points (not shown), which can in turn allow the network interface device 500 to communicate with the cloud-based network 512. In other embodiments, the network 512 can be an internal BMS network, such as a BACnet network, wherein the network 512 can provide communication between BMS devices in the BMS system. The network 512 can be a closed network in some instances, thereby only allowing access to the network 512 from within the BMS system. Alternatively, the network 512 may be an open network, thereby allowing access from a user outside of the BMS network.

In some embodiments, the controller 514 receives data from the host controller 502 via the network interface controller 500 as described above, and then communicates the data to the network 512. Alternatively, the controller 514 may directly communicate the data to other devices, such as the enterprise control applications 516, the client devices 518, the remote systems and applications 520 and/or the monitoring and reporting applications 522. In some embodiments, both the controller 514 and the network 512 may receive data from the network interface controller 500. In one example, the controller 514 can monitor a specific value, such as an analog value exposed to an analog data object 540. Further, the BMS controller may monitor any of the data objects 540 as required or desired by the user.

Figure 7:
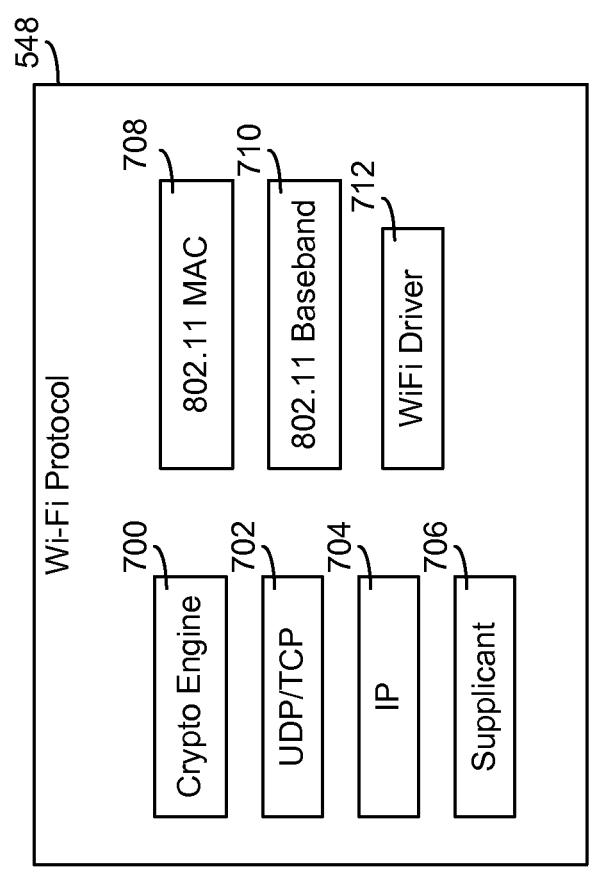
FIG. 7 is a block diagram illustrating a Wi-Fi protocol module, according to some embodiments.

The network and control interface module 534 may further include a Wi-Fi protocol module 548, an application protocols modules 550, a web-server module 552, a control logic module 554 and an internet communications module 556. Turning now to FIG. 7, the Wi-Fi protocol module 548 is shown in additional detail. The Wi-Fi protocol module 548 includes a cryptography engine 700, a UDP/TCP protocol stack 702, an IP protocol stack 1026, a supplicant 1028, a 802.11 MAC stack 708, an 802.11 baseband stack 710, and a Wi-Fi driver 712. In one embodiment, the cryptography engine 700 is configured to support secure and encrypted communication links between the network interface controller 500 and one or more other devices or networks, such as network 512. For example, the cryptography engine 700 can be used to generate secure connections such as TSL and/or SSL connections between the network interface controller 500 and one or more devices or networks. The cryptography engine 700 may further be configured to use Wi-Fi security protocols such as WPS 2.0, WPA2 personal, and/or enterprise security.

In some embodiments, the Wi-Fi driver 712 may be configured to allow the network interface controller 500 to communicate via Wi-Fi using the wireless radio 546. For example, the network interface controller 500 may connect to a wireless devices via the wireless radio 546 using the Wi-Fi driver. Example wireless devices may include routers, wireless BMS devices, user devices, etc. Further, the Wi-Fi driver 712 may be configured to communication using a variety of Wi-Fi modes, such as station, access point, Wi-Fi direct, etc.

Returning now to FIG. 5, the web-server module 552 may be configured to generate a webpage that can be loaded and rendered by an external user device. For example, a user may be able to use a smart device, such as a smart-phone, table computer, etc., to connect to the network interface controller 500 via the wireless radio 546. The web-server module 552 can generate a webpage such that the webpage is rendered on the smart device. In some embodiments, the user may be able to configure the network interface device 500 and/or the host controller 502 via the generated webpage provided by the web-server module 552. The applications protocol module 550 may include one or more communication stacks. For example, the applications protocol module 550 may include a BACnet communication stack, a JavaScript Object Notation (JSON) communication stack, a Zigbee/Zigbee pro communication stack, a Wi-Fi communication stack, an NFC communication stack, a Bluetooth communication stack, a LoRa communication stack, and/or any other wireless communication protocol stack. In one embodiment, the BACnet communication stack can support standard BACnet UDP/IP wireless communications. Further, the BACnet communication stack can utilize standard BACnet IP messaging, allowing for BMS controllers and devices to discover, monitor, and control other I/O points on a BACnet network. Further, the BACnet communication stack 1014 can map physical I/O points associated with a device in communication with the network interface controller 500. The BACnet communication stack can further provide for wireless UPD/IP communication to BACnet connected devices via the network interface controller 500.

In one embodiment, the application protocol module 550 includes a JSON communication stack. The JSON communication stack may be configured to support the internet-of-things (IoT) RESTful JSON HTTP(s) TCP/IP wireless communication. This can allow for mobile devices, such as smart phones (iPHone, Android phone, Windows phone, etc.), table computers (iPad, Microsoft Surface, etc.) or other mobile devices with wireless communication capability to communication with a BMS network, such as network 512. Further, the JSON communication stack can be used to allow a user to commission and/or diagnose one or more BMS devices via the network interface controller 500. For example, a device having a host controller, such as host controller 502, may be configured to communicate with a mobile device through the network interface circuit 500 using the JSON communication stack. In some examples, custom iPhone and/or Android applications can be designed to interface with the integrated wireless network processor circuit 1000 using the JSON communication stack. Additionally, other IoT systems that support RESTful JSON messaging can be used to wirelessly monitor and control a device in communication with the network interface circuit 500.

The control logic module 554 may include one or more control algorithms for controlling one or more host controllers 502, and therefore an associated BMS device 504. The control logic module 554 may be configured to perform closed loop control, feedback control, PI control, PID control, model predictive control, or any other type of automated control methodology to control a variable affected by the operation of the BMS device 504. For example, where the BMS device 504 is an HVAC device, the variable may be a temperature. The control logic module 554 may use the data received via the wireless radio 546, and from the host controller 502 to perform control operations. In some embodiments, the data received from the wireless radio 546 is a request for a certain variable or parameter to be varied or maintained. In one example, the control logic module 554 may use data received from an HVAC device via the wireless radio 546 as inputs to a control algorithm, such as a control algorithm to determine an output for one or more BMS devices (e.g. dampers, air handling units, chillers, boilers, fans, pumps, etc.) in order to affect a variable state or condition monitored by the device controller, such as the host controller 502. In another example, the control logic module may use data received from the network 512 indicating that a certain parameters, e.g. temperature, is to be maintained. The control logic module 554 may then execute one or more control algorithms to set and maintain the variable to the desired setpoint.

The control functionality of the host controller may be implemented entirely by the network interface circuit 500, without requiring additional processing or control components. In one embodiment, the control logic module 554 may be capable of executing MATLAB or similar simulation software code to allow for rapid development of the control algorithms by a user. The control logic module 554 may, after performing the needed control algorithms, write new values to associated attributes of the equipment object 528 for communication to the host controller 502. In one embodiment, the new values are data values required to maintain the variable at a desired setpoint, such as a setpoint received via the network 512. In some embodiments, the control logic module writes new values to the data objects 540, which may then be mapped to the equipment object by the mapping module 542.

The internet communication module 556 may be configured to provide notifications to a user via an internet connections, such as via Wi-Fi. In one embodiment, the internet communication module 556 accesses the internet using the Wi-Fi protocol 548 and/or one or more of the application protocols 550 in combination with the wireless radio 546. For example, the wireless radio 546 can communicate with a network, such as network 512, to establish a connection to the internet. The internet communication module 556 may then provide a notification to a user by generating an electronic message such as an e-mail or a text message. Additionally, the notification can be provided to a user via a push notification provided to a mobile device associated with the user. In one example, e-mail addresses and/or cellular telephone numbers can be stored in the memory 510 corresponding to relevant users. In some embodiments, the notification can inform a user of a fault condition. Other notifications can include needed maintenance, current status, or even a user defined data history. For example, a user may request a notification providing historical data of one or more BMS devices in communication with the network interface controller 500. The network interface controller 500 may then generate a historical report based on the user input, and transmit the historical report to the user via the internet communication module 556.

Further, the internet communication module 556 may be configured to allow for updates to be provided to the network interface circuit 500. For example, a firmware update may be able to be pushed to the network interface circuit 500 over the internet using the internet communication module 556. In other embodiments, the internet communication module 556 is configured to allow for cloud-based control of the network interface circuit 500. For example, the network interface circuit 500 can be in communication with one or more BMS devices, such as BMS device 504. The network interface circuit 500 may further be in communication with a cloud-based control system via the internet communication module 556. The cloud-based control system can then be accessed by users with the proper credentials via a connection to the internet. Based on a permission level of a user accessing the cloud based-based control system, the user can read and/or write values to certain parameters associated with BMS devices in communication with the network interface circuit 500 via a user interface.

The host controller 502 may include a processing circuit 558. The processing circuit may include a processor 560 and a memory 562. The processor 560 may be a general purpose or specific purpose processor, an application specific integrated circuit (ASIC), one or more field programmable gate arrays (FPGAs), a group of processing components, or other suitable processing components. The processor 560 is configured to execute computer code or instructions stored in the memory 562 or received from other computer readable media (e.g., CDROM, network storage, a remote server, etc.).

The memory 562 may include one or more devices (e.g., memory units, memory devices, storage devices, etc.) for storing data and/or computer code for completing and/or facilitating the various processes described in the present disclosure. The memory 562 may include random access memory (RAM), read-only memory (ROM), hard drive storage, temporary storage, non-volatile memory, flash memory, optical memory, or any other suitable memory for storing software objects and/or computer instructions. The memory 562 may include database components, object code components, script components, or any other type of information structure for supporting the various activities and information structures described in the present disclosure. The memory 562 may be communicably connected to the processor 560 via the processing circuit 558 and may include computer code for executing (e.g., by the processor) one or more processes described herein. When the processor 560 executes instructions stored in the memory 562, the processor 550 generally configures the host controller 502 (and more particularly the processing circuit 558) to complete such activities.

In one embodiment, the memory stores a host application 564. The host application 564 can include the required application for operating the host device. In one embodiment, the host application 564 can generate updated values for the attributes of the equipment object 528, which can be communicated to the device interface 524 via the UART interfaces 532, 534, as described above. The host application 564 can include software to read and store data received by the host controller 502. For example, the host controller 502 may include sensors for detecting various attributes of the host controller 502. Example sensors can include voltage sensors, current sensors, temperature sensors, position sensors, pressure sensors, or other applicable sensors. The host application may read and/or store the data from these sensors within the memory 562. Further, the host controller 502 may include other data such as setpoints, position commands, diagnostic data, etc., which the host application 564 can further read and store in the memory 562.

The host application 564 can further receive data and/or commands for controlling the host controller 502. In one embodiment, the host interface 535 may receive data via the UART interface 534, and communicate the data to the host application 564. For example, the controller 514 may communicate with the network interface controller 500 and change a setpoint within an analog value data object 540.

The network and control interface module 534 may then modify the corresponding attribute in the equipment object 528, which can then be communicated to the host controller 502 via the UART interfaces 532, 534. The host interface 535 can then receive the data via the host API 537. The host interface 535 may be configured to convert the received data (e.g. the setpoint change) into a format compatible with the host application 564. The host application 564, receiving the data (setpoint change) can then implement the setpoint change on the host controller 502, and thereby the BMS device 504. In some embodiments, the host application 564 may receive inputs or commands directly from a user interface (not shown) of the host controller 502. The host application 564 can then update any changes provided via the user interface in the equipment object 528 by communicating the changes to the host interface 535. The host interface 535 may then communicate the changes to the equipment object 528 via the UART interfaces 532, 534.

The network interface controller 500 may further include a serial peripheral interface (SPI) bus driver 566. The SPI bus driver 566 can be configured to drive a peripheral port 568 coupled to the network interface controller 500. In one embodiment, the peripheral port 568 is a serial flash interface, such as a USB port, an SD or micro SD port, a compact flash (CF) port, etc. The peripheral port 568 may further be a serial interface (RS-232, RS-485) for direct wired connection to a hardware device, such as a commissioning tool or a programming tool. The peripheral port 568 can be used to allow for communication directly with the network interface controller 500. In some examples, the peripheral port 568 can be used to provide a software (SW) and/or a firmware (FW) update directly to the network interface controller 500. Further, the peripheral port 568 may be configured as a programming port, thereby allowing a user to directly program the network interface controller 500. For example, a user may access the network interface controller 500 via the peripheral port 568 to program the attributes of the equipment object 528 that are to be exposed to the network and control interface 526. In some examples, the peripheral port 568 can be used to provide additional memory, such as flash memory (SD, CF, etc.), to the network interface controller 500. The additional memory may be used to store data associated with the host controller 502, such as historical data, alarm history, data logs, etc.

The network interface controller 500 may further include an indication device 562. In one embodiment, the indication device 562 can include one or more illumination devices, such as LEDs. However, the indication device 562 can further include other illumination devices, auditory indication devices (speakers, buzzers), or a combination thereof. In one embodiment, the indication device 562 provides a visual indication that the communication circuit is communicating with the network 512 and/or the controller 514. Alternatively, the indication device 562 can provide an indication that the network interface controller 500 is communicating with the host controller 502. In a further embodiment, the indication device 562 can provide an indication of a status of the network interface controller 500. For example, the indication device 562 may present one color (e.g. green) when the network interface controller 500 is functioning properly, and a second color (e.g. red) when the network interface controller 500 is not functioning properly. Further, the indication device 562 may provide an indication of a status of the host controller 502 instead of, or in addition to the network interface controller 500. In still further examples, the indication device 562 may provide a series of visual and/or audible outputs in a repeating pattern that may represent a certain fault currently experienced by the network interface controller 500 and/or the host controller 502.

Figure 8:
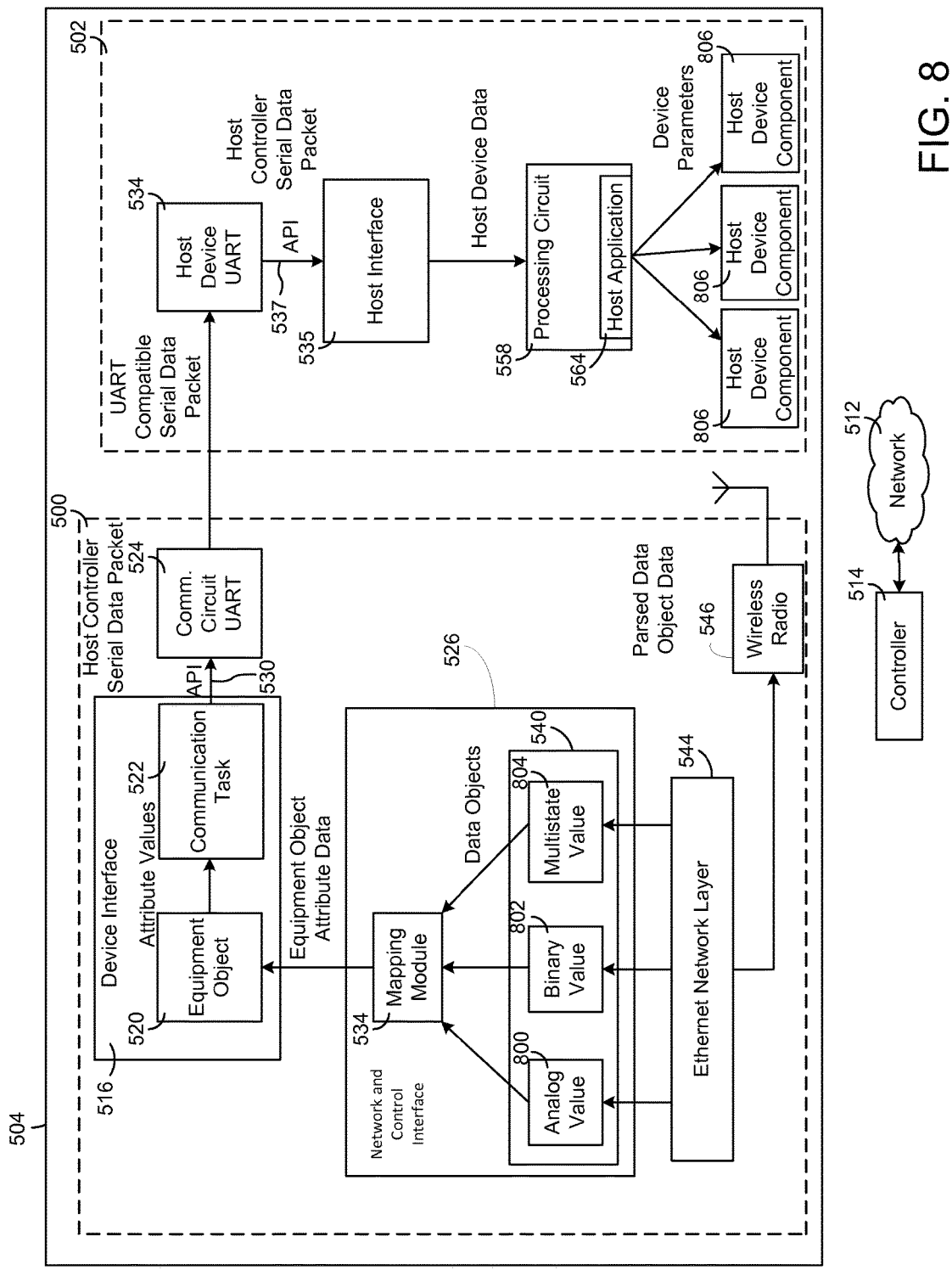
FIG. 8 is a block diagram the flow of data from a network to the network interface controller of FIG. 5, according to some embodiments.

Turning now to FIG. 8, a block diagram illustrating the flow of data from the network 512 and/or the controller 514 to the network interface controller 500 is shown, according to some embodiments. As shown in FIG. 8, network 512 is a BACnet network; however, other networks are contemplated. The network 512 and/or the controller 514 may provide BACnet data to the network interface controller 500. The BACnet data may be received by the Ethernet/MSTP layer 544 via the wireless radio 546. The Ethernet/MSTP layer 544 may parse the received BACnet data. In one example, the Ethernet/MSTP layer 544 may parse the received BACnet data into isolated data associated with one or more data objects 540. For example, the Ethernet/MSTP layer 544 may first parse the data based on data type (analog, binary, multistate, etc. The Ethernet/MSTP layer 544 may then evaluate an ID associated with the BACnet data to determine what type of data object is associated with the received BACnet data. The Ethernet/MSTP layer 544 may then transmit the parsed BACnet data to one or more data objects 540 via the network interface. For example, the Ethernet/MSTP layer 544 may transmit parsed analog BACnet data to the analog data object 800, parsed binary BACnet data to the binary data object 802, and parsed multistate BACnet data to the multistate data object 804. This is exemplary only, as there may be more data object types available, as described above. Further, multiples of each data object type may further be provided. In one embodiment, the Ethernet/MSTP layer 544 can instruct the network interface to generate new data objects 540 when BACnet data is received that is not associated with an existing data object 540. The data objects 540 may then provide the associated data object 540 data to the mapping module 542. The mapping module 542 may then receive the data object 540 data by querying each of the data objects 800, 802, 804 to determine if a value had been updated. Alternatively, the data objects 800, 802, 804 may provide an interrupt, or other signal, to the mapping module 542 to instruct the mapping module 542 to read a new data object 540 value. The mapping module 542 may then evaluate the received data object 540 data to determine which attribute of the equipment object 528 the received data object 540 data is associated with and transmit the data to the equipment object 528 as equipment object attribute data via the network and control interface 526. In one embodiment, the mapping module 542 transmits equipment object 528 attribute data for each of the one or more data objects 540 to the equipment object 528, where the equipment object attributes associated with the one or more data objects 540 are exposed to the network and control interface 526. Similarly, the mapping module 542 may only transmit equipment object attribute data to the equipment object 528 where the associated equipment object attribute is a writeable attribute. As will be described later, a user, via a configuration tool, can configure equipment object attributes that are exposed and/or writable.

The equipment object 528 may then transmit attribute values to the integration task module 530. The equipment object attribute values may contain the attribute ID, as well as the data type and value. Alternatively, the equipment object attribute values may only contain the value associated with the equipment object attribute. In some embodiments, the integration task module 530 reads the attribute values for the equipment object attributes, and determines if any values have been changed. The integration task module 522, receiving the equipment object attribute values, may then convert the equipment object attribute values into one or more host controller serial data packets. The host controller serial data packets may be configured such that the data packets are readable by the host controller 502. The host controller data packets may then be read by the UART 532 and converted into a UART compatible serial data packet. In one example, the API 538, as described above, may be used to convert the host control serial data packets into UART compatible serial data packets. In other examples, the UART 532 may convert the attribute values into UART compatible serial data packets itself. The UART 532 may then transmit the UART compatible serial data packet containing the attribute values to the host controller 502. The UART 534 can receive the UART compatible serial data packet and convert the data into host controller serial data packets, readable by the host controller 502. In one embodiment, the UART 534 can perform the conversion. In other embodiments, the API 537 can convert the UART compatible serial data packet into a host controller serial data packet. The host controller serial data packet may then be received by the host interface 535. The host interface 535 may then convert the host controller serial data packet into host device data to be processed by the processing circuit 558. The host device data may be a proprietary data format used by the processing circuit 558 of the host controller 502. In other examples, the host device data may be a standard data type used by the particular processing circuit 558.

The processing circuit 558 can then read the host device data via the host application 564. The host application 564 allows the data to be parsed and executed. In some embodiment, the host application 564 may output device parameters to one or more host device components 806. The host device components may be any components in communication with the processing circuit 558. For example, the host device components 806 may include switches, motor controllers, sensors, relays, indicators, or any other components within the BMS device 504 which is used by the BMS device 504 to operate. For example, a host device component 806 may be a motor starter relay. The host application 564, via the processing circuit 558 may output a logic "1" (e.g. a digital "high") to the motor starter relay to close, thereby turning on a motor. In a more complex example, the host device component 806 may be a variable frequency motor controller. In this example, the host application 564 via the processing circuit 558 may output a motor speed command. Thus, a command or request may be generated by the network 512 and/or the controller 514 and executed at a component level of the BMS device 504 using the above embodiment.

Figure 9:
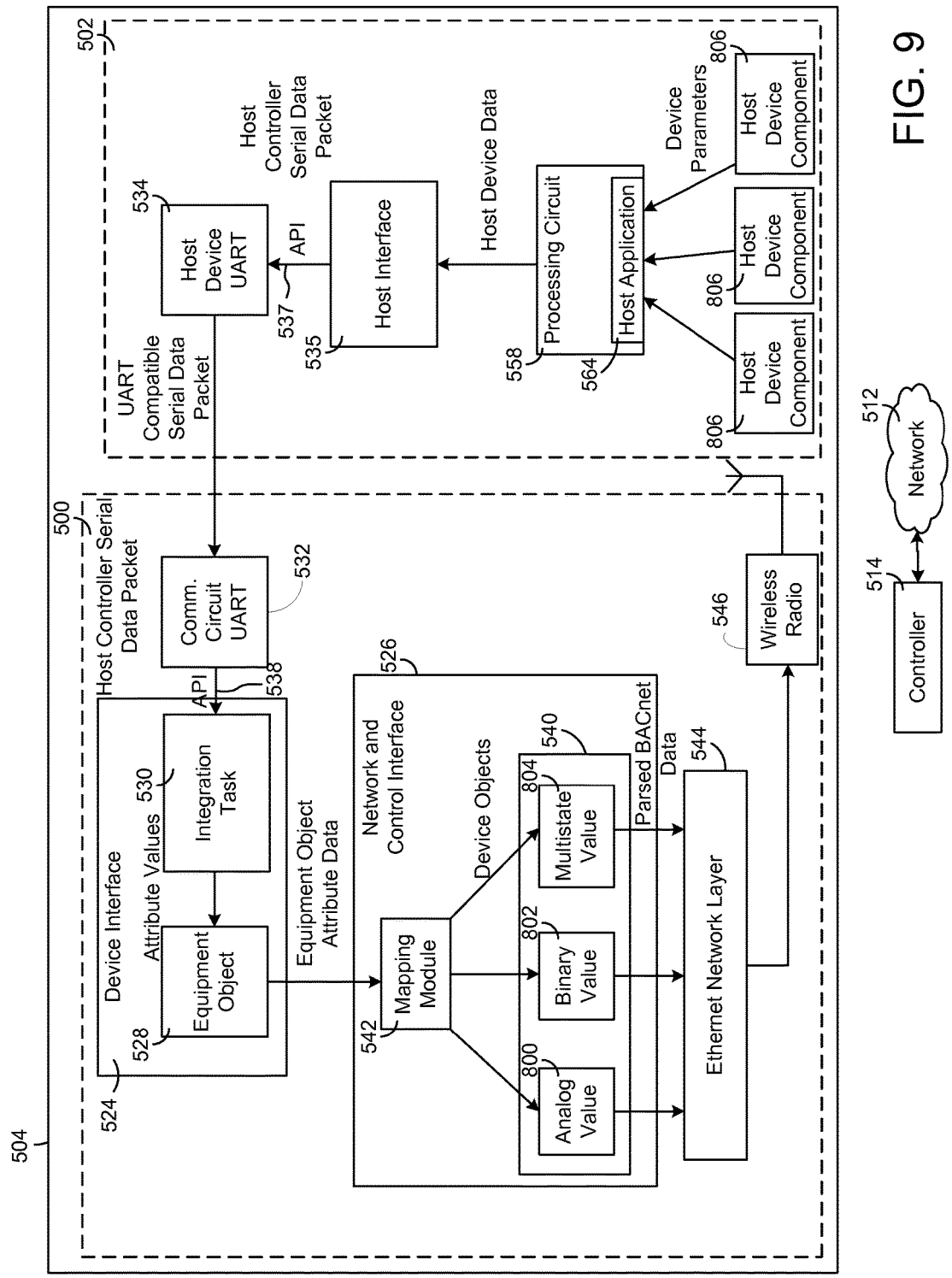
FIG. 9 is a block diagram illustrating the flow of data from the host controller to the network of FIG. 5, according to some embodiments.

Turning now to FIG. 9 a block diagram illustrating the flow of data from the host controller 502 to the network 512 and/or the controller 514 is shown, according to some embodiments. Within the BMS device 504, one or more of the host device components 806 may provide device parameters associated with one or more parameters of the host device component 806 to the processing circuit 558. Device parameters can include parameters related to motor speed, temperature, positions, or any other device parameters associated with the host device components 806 within the BMS device 504. The device parameters can be processed by the host application 564 within the processing circuit 558. In some embodiments the processing circuit 558 may determine that the received device parameters may need to be provided to the network 512 and/or the controller 514. For example, the processing circuit 558 may be configured to provide all updated parameters to the network 512 and/or the controller 514. In other examples, the processing circuit 558 may be configured to provide device parameters to the network 512 and/or the controller 514 when the device parameters exceed a certain value. In still further examples, the processing circuit 558 may provide the device parameters to the network 512 and/or the controller 514 at predetermined intervals or at predetermined times of the day. For example, the processing circuit 558 may be configured to provide the device parameters to the network 512 and/or the controller 514 at 6 A.M., Noon, 6 P.M. and Midnight. However, the predetermined intervals or times may be any predetermined intervals or times provided by a user. Additionally, the processing circuit 558 may be configured to provide the device parameters to the network 512 and/or controller 514 upon receiving an instruction to do so from the network 512 and/or the controller 514. This may be in conjunction with any of the other configurations described above. Further, the processing circuit 558 may also provide additional data associated with the processing circuit 558 itself, such as alarms, data logs, etc.

The processing circuit 558 may provide host device data containing data relating to the BMS device 504 (e.g. the processing circuit 558 and/or the host device components 806) to the host interface 535. The host interface 535 may be configured to receive the host device data and convert the host device data received from the processing circuit 558 into one or more host controller serial data packets for transmission to the network interface controller 500. The host controller serial data packet may then be provided to the UART 534, which may convert the host controller serial data packet into a UART compatible serial data packet. In one embodiment, UART 534 may convert the host controller serial data packet into the UART compatible serial data packet. Alternatively, the API 537 may be used to convert the host controller serial data packet into the UART compatible serial data packet. The UART serial data packet may then be transmitted to the UART 532 of the network interface controller 500. The UART 532 may then convert the UART serial data packet back into the host controller serial data packet. In some embodiments, the API 538 converts the UART serial data packet into the host controller serial data packet.

The host controller serial data packet may then be received by the integration task module 530. The integration task module 530 can read the host controller serial data packet and parse the host controller serial data packet to extract one or more attribute values. In one embodiment, the attribute values are values associated with the BMS device 504, such as the device parameters of the host device components 806, or values associated with the processing circuit 558. The integration task module 530 may then output the attribute values to the respective attributes within the equipment object 528. In one embodiment, the integration task module 530 may determine which parsed values are associated with a given attribute of the equipment object by reading an identifier associated with each portion of the received data, and map that to a corresponding attribute within the attribute value. In one example, a user can configure the equipment object attributes to relate to data received from the host controller 502 by assigning certain data identifiers contained within the host controller serial data packet to a given equipment object attribute. As will be discussed in more detail below, the equipment object 528 can be configured using a configuration device.

The attribute values stored within the attributes of the equipment object 528 can be read by the mapping module 542. The mapping module 542 may determine if an attribute value has changed by constantly monitoring the equipment object 528. In other embodiments, the equipment object 528 may provide an interrupt signal to the mapping module 542, indicating that an attribute value has been updated. The mapping module 542 may then read the equipment object attribute data from the equipment object 528 and convert the equipment object attribute data in to data object 540 data. The mapping module 542 may further be configured to then transmit the updated data object 540 data to the appropriate data object 800, 802, 804. In some instances, a data object 540 may not currently exist that is associated with a particular equipment object attribute. The mapping module 542 may then generate a new data object via the network and control interface module 534. In one embodiment, the mapping module 542 may already be configured to associate a given data object 534 with an equipment object 528 attribute. In one embodiment, the mapping module 542 may read an attribute ID for each received equipment object attribute data to determine which data object 540 to map the received data to. In some embodiments, the equipment object 528 may be configured to not expose certain attributes to the mapping module 542. In those instances, the received attribute values are stored in the equipment object 528, but are not provided to the mapping module 542.

Once the data objects 540 receive the data object data, the Ethernet/MSTP layer 544 can read the data objects 540 to determine if any values have been modified. In one embodiment, the Ethernet/MSTP layer 544 may constantly read all of the data objects 540 to determine if any values have been changed. In other embodiment, one or more of the data objects 540 may provide an interrupt signal to the Ethernet/MSTP layer 544 to indicate a value has changed. The Ethernet/MSTP layer 544 may then read one or more of the data objects 540 to receive parsed object data from the data objects 540. For example, if the binary data object 802 contained updated information, the Ethernet/MSTP layer 544 may request and receive data only from the binary data object 802. The Ethernet/MSTP layer 544, receiving the parsed object data may then convert the parsed object data into standard network data. In one embodiment, the standard network data is BACnet data. The Ethernet/MSTP layer 544 may then transmit the network data containing the data from the BMS device 504 to the network 512. In one embodiment, the Ethernet/MSTP layer 544 transmits the network data over Wi-Fi using the wireless radio 546. As described above, the Ethernet/MSTP layer 544 may, in some examples, only transmit the network data to the network 512 when one or more external devices are subscribed to receive data from the host device 504 via a subscription service, such as a BACnet subscription service. In other embodiments, the Ethernet/MSTP layer 544 may make the network data available to be read by one or more external devices or systems via the network 512.

Figure 10:
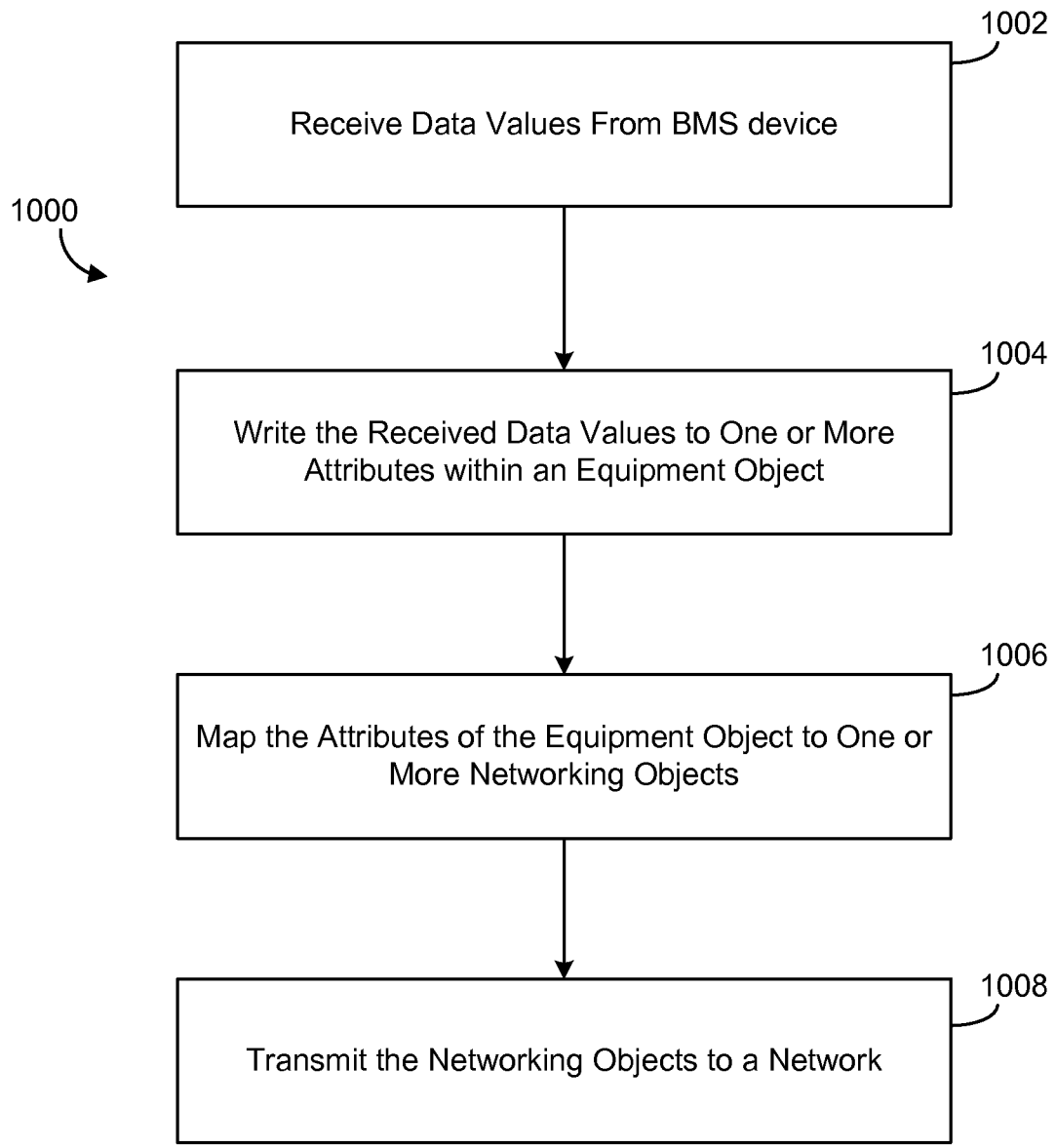
FIG. 10 is a flow chart illustrating a process for communicating data from a BMS device to an external network using the network interface device of FIG. 5, according to some embodiments.

Turning now to FIG. 10, a flow chart illustrating a process 100 for communicating data from a BMS device to an external network as described in FIG. 8 using the system of FIG. 5, is shown, according to some embodiments. At process block 1002, one or more data values may be received from the BMS device 504 via the host controller 502. The data values may be associated with BMS device 504. The data values may be received by the network interface controller 500 via the UART interfaces 532, 534. At process block 1004, the received data values may be written to one or more attributes within the equipment object 528. In one embodiment, the integration task module 530 writes the values into the associated equipment object attributes within the equipment object 528. At process block 1006, the one or more equipment object attributes stored within the equipment object 528 are mapped to one or more data objects 540. In one embodiment, the data objects 540 are the BACnet objects. Further, the equipment object attributes may be mapped to the one or more data objects 540 by the mapping module 542, as described above in FIG. 8. Finally, at process block 1008, the data objects 540 may be exposed to the network 512. In one embodiment, the Ethernet/MSTP layer 544 transmits the data objects 540 to the network 512 as described above in FIGS. 5 and 8, where one or more external devices have subscribed to the BMS device 504 via a Subscription Service.

Figure 11:
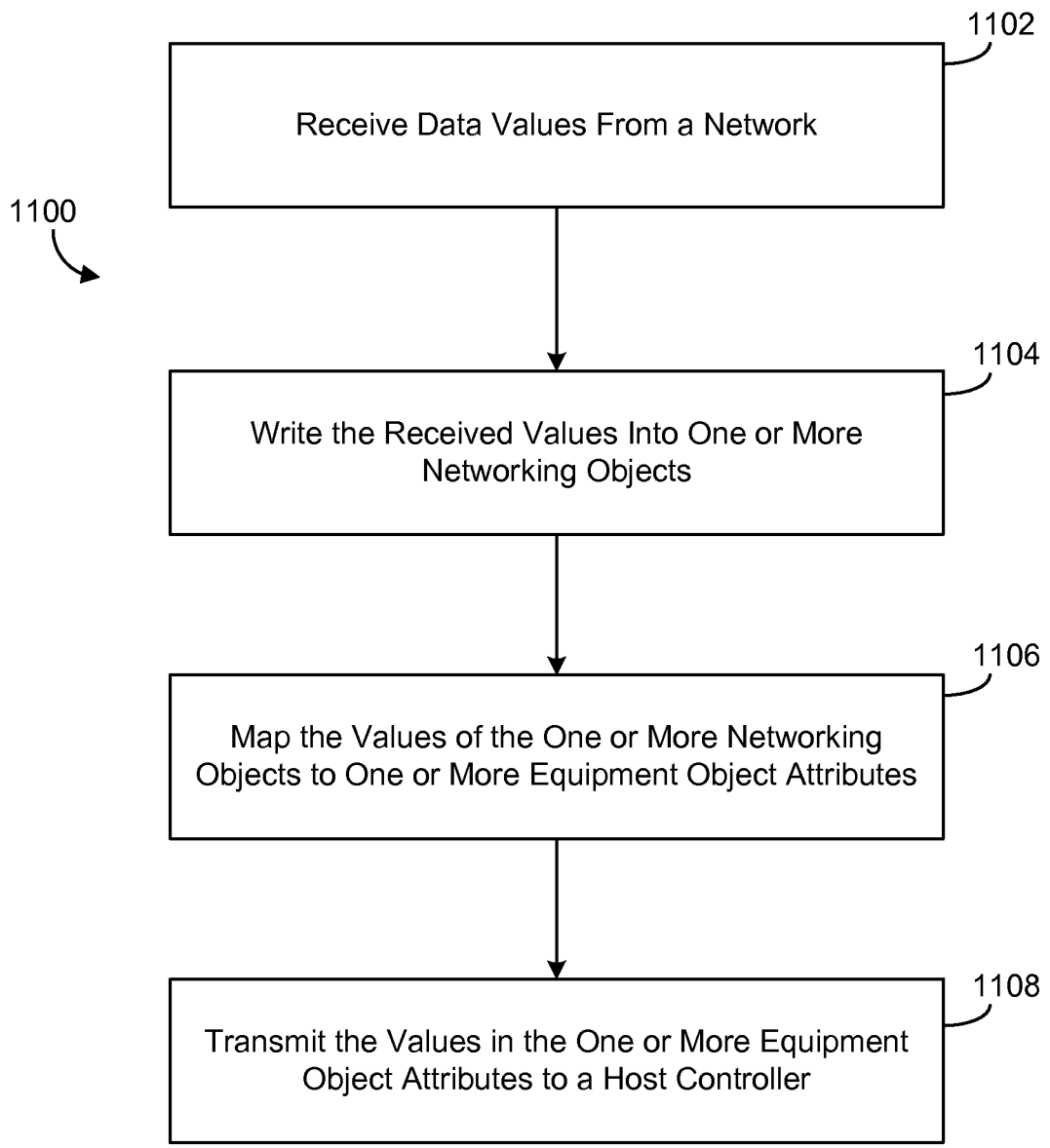
FIG. 11 is a flow chart illustrating a process for communicating data from a network to a host controller using the network interface device of FIG. 5, according to some embodiments.

Turning now to FIG. 11, a flow chart illustrating a process 1100 for communicating data from a network to a BMS device 504 host controller 502, as described in FIG. 9 and using the system of FIG. 5, is shown, according to some embodiments. At process block 1102, one or more data values are received from the network 512. In one embodiment, the data values are data values to be written to the BMS device 504 via the host controller 502. At process block 1004, the received data values are written into one or more data objects 540. In one embodiment, the networking objects are BACnet objects. In a further embodiment, the received data values are written into the one or more data objects 540 by the Ethernet/MSTP layer 544, as described in FIG. 5. At process block 1106, the values written in the one or more data objects 540 are mapped to one or more equipment object attributes within the equipment object 528. In one embodiment, the mapping module 542 maps the values written in the one or more data objects 540 to the one or more equipment object attributes within the equipment object 528. Finally, at process block 1108, the values written to the one or more equipment object attributes within the equipment object 528 are transmitted to the host controller 502 of the BMS device 504. In one embodiment, the integration task 530 reads and transmits the values in the equipment object attributes within the equipment object 528 as described in FIGS. 5 and 9. Further, the data values can be transmitted to the host controller 502 via the UART interfaces 532, 534.

Figure 12:
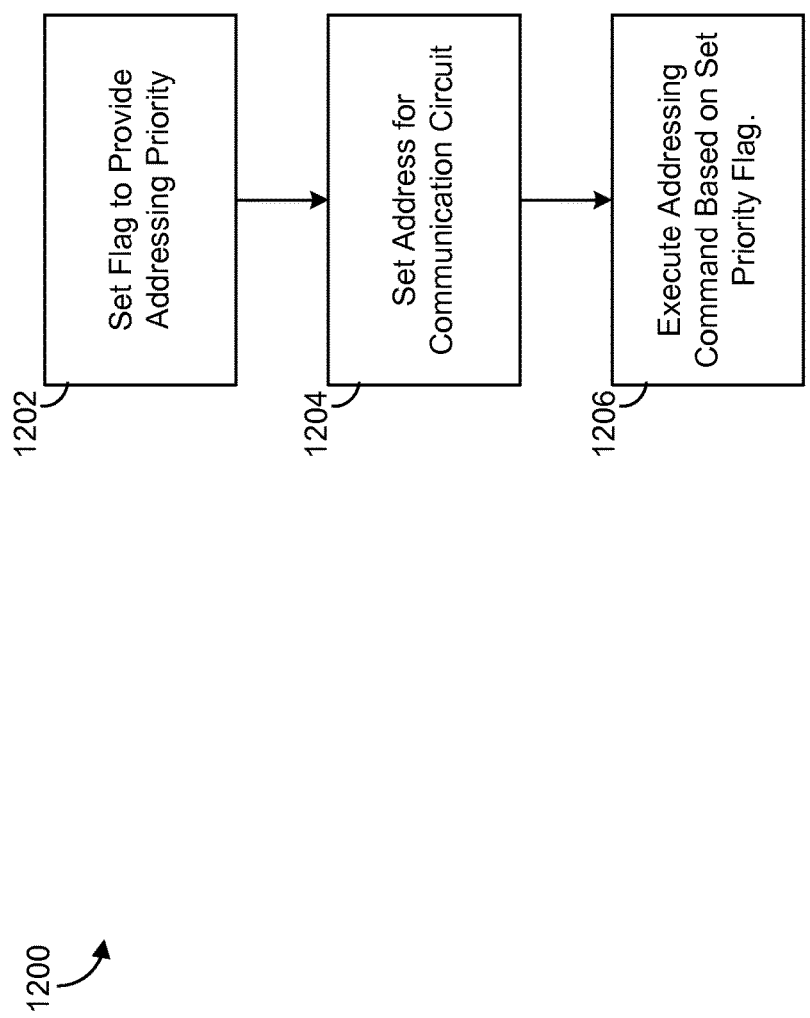
FIG. 12 is a flow chart illustrating a process for addressing the network interface controller of FIG. 5, according to some embodiments.

Turning briefly to FIG. 12, a process 1200 for addressing the network interface controller 500 is shown, according to some embodiments. At process block 1202, a flag can be set in the network interface controller 500 to establish which type of addressing has priority for the network interface controller 500. Example addressing types, as described above, may include via the network interface controller 500 itself (e.g. via address switches), or via an external addressing source. External addressing sources may include the network 512, the host controller 502, and/or an external device coupled to the peripheral port 560. Furthermore, the flag may be set via the network 512, via the host controller 502, or via a device coupled to the peripheral port 568. Additionally, in some embodiments, the priority can be a default priority programmed into the network interface controller 500. At process block 1204, the address may be set for the network interface controller 500 using one of the above methods. For example, a user may address the network interface controller 500 using an address switch. For example, the network interface controller 500 may have a plurality of DIP switches that may be used to address the network interface controller 500. Finally, at process block 1206, the network interface controller 500 may execute the addressing command set in process block 1204, based on the set priority flag. For example, if the address switch provides one address for the network interface controller 500, and a second address is provided via an external source (e.g. via the network 512, host controller 502, or peripheral port 560), the network interface controller 500 may set the address based on which method of addressing is given priority. Thus, if the flag is set to give priority to external source addressing, the network interface controller 500 may override an address entered via the address switch, and set the address provided by the external source.

Figure 13:
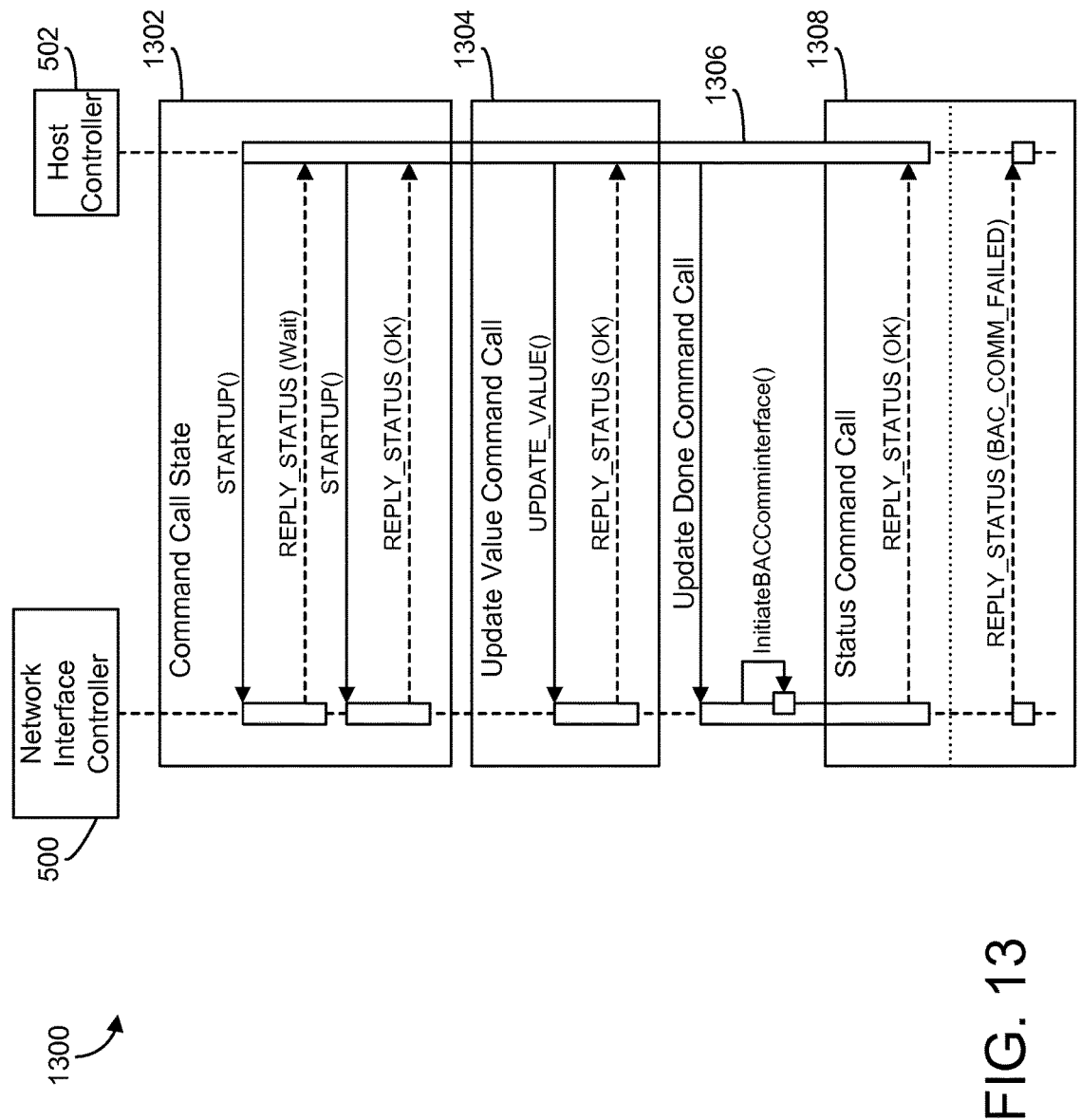
FIG. 13 is a sequence diagram illustrating an example startup process, according to some embodiments.

In some embodiments, when the network interface controller 500 is initially powered up or restarted, the network interface controller 500 may require the host controller 502 to execute a startup sequence. The startup sequence may be designed to allow both the network interface controller 500 and the host controller 502 to synchronize data between them. In one embodiment, the host controller 502 is responsible for initiating the startup sequence. However, in some examples the network interface controller 500 may initiate the startup sequence. Turning now to FIG. 13, a sequence diagram showing an example startup sequence 1300 is shown, according to some embodiments. The startup sequence 1300 is shown to have the host controller 1302 initiate the startup sequence 1300 with the network interface controller 500. At the startup command call state 1302, the host controller 502 may continuously send a startup command until the host controller receives an "OK" reply status from the network interface controller 500. Where the host controller 502 receives a "wait" reply status form the communication circuit, or no reply status at all, the host controller 502 may continuously repeat the startup command. In some embodiments, the host controller 502 will continuously send the startup command to the network interface controller 500 until a predetermined amount of time expires. For example, the predetermined time may be five seconds. However, the predetermined time may be more than five seconds or less than five seconds. Further, the host controller 502 may be configured to continuously send the startup command to the network interface controller 500 for a predetermined number of attempts. For example, the predetermined number of attempts may be twenty. However, more than twenty attempts or less than twenty attempts are contemplated predetermined values as well.

Upon receiving the "OK" status, host controller 502 may then send a number of values to the network interface controller 500 during the Update Value Command Call state 1304. The values can represent attributes of an equipment object, as described above. In one embodiment, the network interface controller 500 responds to each update value command with an "OK" reply status. Once the host controller 502 has sent all of the updated values, the host controller 502 may then transmit an "Update Done" command to the network interface controller 500 during the Update Done Command Call state 1306. In one embodiment, the network interface controller 500 can begin initiating communication with an external network once the Update Done command has been received. For example, the network interface controller 500 may initiate communication with a BACnet network once the Update Done command has been received. At Status command call 1308, the network interface controller 500 can send a reply status OK, indicating communication with the external network is operating correctly. Where the communication between the network interface controller 500 and the external network fails, the network interface controller 500 may send a "comm_failed" reply status to the host controller 502.

In some examples, the host controller 502 may perform the startup sequence 1300 more than once. Where the host controller 502 initiates the startup sequence 1300 more than once, the network interface controller 500 performs the startup sequence 1300 as described above, except that it will only initialize the communications with the external network for the first startup sequence request from the host controller 502, unless the communication with the external network failed during the first attempt. Once the communication between the network interface controller 500 and the external network has been initiated, the network interface controller 500 will send an "OK" reply command to the host controller 502 in response to the "Update Done" command for each subsequent startup sequence 1300 request. Further, where the startup sequence 800 is not initiated after a restart of the network interface controller 500, the network interface controller 500 will reply to all requests by the host controller 502 with an error message indicating that the network interface controller 500 has been restarted and is awaiting the startup sequence 1300.

As described in FIG. 5, a host controller and a communication circuit may perform data exchanges, which will be described in more detail below. These data exchanges utilize data packets to perform the data transfers. Each data packet may use multiple data units of varying sizes. Example data units are illustrated in Table 1, below.

TABLE 1

Data Unit Definitions

| Data Unit Name | Number of Bits |
|---|---|
| UCHAR | 8 |
| USHORT | 16 |
| ULONG | 32 |
| FLOAT32 | 32 |
| Variable | Any (in 8 bit increments) |

The order of the bytes for any of the above data units may follow one or more conventional formats. In one embodiment, the above data types follow the Big Endian format, wherein the most significant byte of a value is transmitted first. As shown above, the FLOAT32 data unit can be formatted according to ANSI/IEEE standard 754-1985 "IEEE Standard for Binary Floating-Point Arithmetic."

Table 2, shown below, depicts an exemplary packet structure which may be used in communication between a communication device and a host device, as described above.

TABLE 2

Basic Packet Structure

| SoT | LENGTH | CMD | DATA | CRC | EoT |
|---|---|---|---|---|---|
| UCHAR | USHORT | UCHAR | VARIABLE | USHORT | UCHAR |

As shown in Table 2, the basic packet structure begins with a Start of Transmission (SoT) character. The SoT character may be defined as a standard 8-bit data character. For example, the SoT character can be defined as a value 0x72h. Similarly, the End of Transmission (EoT) character, which is the last character within the data packet, may be defined as a standard 8-bit data character as well. For example, the EoT character may be defined as a value of 0x73h. The purpose of the SoT character and the EoT character is to allow the receiving device (e.g. a communication circuit or a host device) to detect that a full length message has been sent or received. The SoT character within the packet structure is followed by the LENGTH character. The LENGTH character is defined as a USHORT data type. The LENGTH character is defined as the size of the CMD character and the DATA character, combined. In one embodiment, the LENGTH character can define the size of the combination of the CMD character and the DATA character in the number of Octets. Alternatively, the LENGTH character can define the size of the combination of the CMD character and the DATA character in the number of bytes. The CMD character represents commands that either the host device or the communication device exchange for a given action. The DATA field is only present in certain commands and may vary in size depending on the specific command provided in the CMD character. A cyclic redundancy check (CRC) character then follows the DATA field. The CRC character can be a standard CRC polynomial used as an error-detecting code. For example, the CRC polynomial can be x16+12+x5+1. As stated above, the EoT character ends the basic data packet. The data packet structure may have a minimum and maximum size. In one embodiment, the minimum size is seven Octets and the maximum size is eighteen Octets. However minimum sizes greater than seven Octets or less than seven Octets, and maximum sizes greater than eighteen Octets or less than eighteen Octets are contemplated.

Table 3, below, shows example command codes that may be issued between a host device and a communication circuit, such as those described above. Table 3 further shows possible replies to the given commands. As stated above, each command instructs the receiving device (i.e. the host device or the communication circuit) to execute one or more routines. In one embodiment, the command codes are incorporated within the CMD character of the basic packet structure, described above in Table 2.

TABLE 3

Exemplary List of Commands

| Host Device Command | Communication Circuit (CC) Reply Command | DESCRIPTION | OP CODE |
|---|---|---|---|
| START UP | | The command sent by host device to CC which allows CC to initialize and signal to the host device when ready for normal communication. | 0x01 |
| | REPLY STATUS | Simple command to return Status. Possible Status returned to START UP are OK, WAIT, CRC_ERROR. | 0x06 |
| UPDATE HOST | | The periodic command sent from the host device to the CC requesting if any attribute has changed. Two possible replies from CC. | 0x02 |
| | UPDATE HOST REPLY | A reply command from the CC to the host device UPDATE HOST request, giving the attribute number that has changed. If nothing has changed a Reply Status is sent instead. The host device will then read the value of the attribute specified in this command. | 0x03 |
| | REPLY STATUS | Simple command to return Status. Possible Status values OK, CC_NOT_STARTED, CRC_ERROR | 0x06 |
| UPDATE VALUE | | A command issued by the host device for it to send a new value for the specified attribute. | 0x04 |
| | REPLY STATUS | Possible Status values OK, CC_NOT_STARTED, ATTRIBUTE_ID_NOT_FOUND, INVALID_ENUM_VALUE, CRC_ERROR | 0x06 |
| READ VALUE | | The command issued by the host device to read an attribute value from the CC. The value read will be typically be the value returned in the UPDATE HOST REPLY command. | 0x05 |
| | UPDATE VALUE | The command issued by JBOC to reply with the requested value. | 0x04 |
| | REPLY STATUS | Possible Status values CC_NOT_STARTED, ATTRIBUTE_ID_NOT_FOUND, CRC_ERROR | 0x06 |
| RESTART JBOC | | The command from the HOST to restart the CC. After restarting CC will wait for the START UP command | 0x07 |
| | REPLY STATUS | Possible Status values OK, CRC_ERROR | 0x06 |
| UPDATE DONE | | The command from the host device to the CC. Host device is done sending all his initial updates | 0x08 |
| | REPLY STATUS | Possible Status values OK, JBOC_NOT_STARTED, CRC_ERROR | 0x06 |

Table 4, below, provides an exemplary list of status codes that can accompany a Reply Status command.

TABLE 4

Status Codes

| Reply Status Code | Description | OP Code |
| --- | --- | --- |
| OK | Everything is OK | 0x01 |
| WAIT | Busy | 0x02 |
| CC_NOT_STARTED | Communication Circuit is yet to start, host device should initiate startup sequence | 0x03 |
| ATTRIBUTE_ID_NOT_FOUND | Communication_Circuit could not find attribute value requested in the Read request | 0x04 |
| CRC ERROR | CRC validation failed | 0x05 |
| BAC_COMM_FAILED | Failed to initialize the BACCOM interface | 0x06 |
| INVALID_ENUM_VALUE | An enumeration value was sent by the host in the Update Value command that is too large for the set defined. | 0x08 |

In one embodiment, communication and data transfers (such as those described above) are initiated only by a host controller. The associated communication circuit therefore will only respond to a request from the host controller. However, in other examples, the communication circuit may initiate communication with the host controller. Further, standard timing requirements may be used to ensure proper communication between a communication circuit and the host controller. In one embodiment, the maximum delay between characters of a message being transmitted by a host controller or a communication device is fifty milliseconds. However, maximum delays of more than fifty milliseconds or less than fifty milliseconds are considered. In some embodiments, the host device will wait for a predetermined time period for a response from a communication circuit after transmitting a message/request. In one embodiment, the predetermined time period is two seconds. However, predetermined time periods of more than two seconds or less than two seconds are also considered. The host controller, not receiving a response from the communication circuit by the expiration of the predetermined time may cancel the original request and resubmit the message/request to the communication circuit.

In some embodiments, a network interface controller, such as network interface controller 500, may be configured to persist values, such that the values can be modified via an external network for the host controller 502. In one example, the external network is a BACnet network. Generally, a host controller 502 may already persist those values identified as being able to be modified via an external network, so the network interface controller 500 is configured to not persist the values that can be written via the external network 512. Where the host controller 502 persists the values, the host controller 502 is the source of all persisted values, and must synch the persisted values when the host controller 502 is initialized. If the network interface controller 500 is configured to persist the written values, the network interface controller must flag all of the values that are persisted as having changed during a startup process, and send the changed persisted values to the host controller 502.

Figure 14:
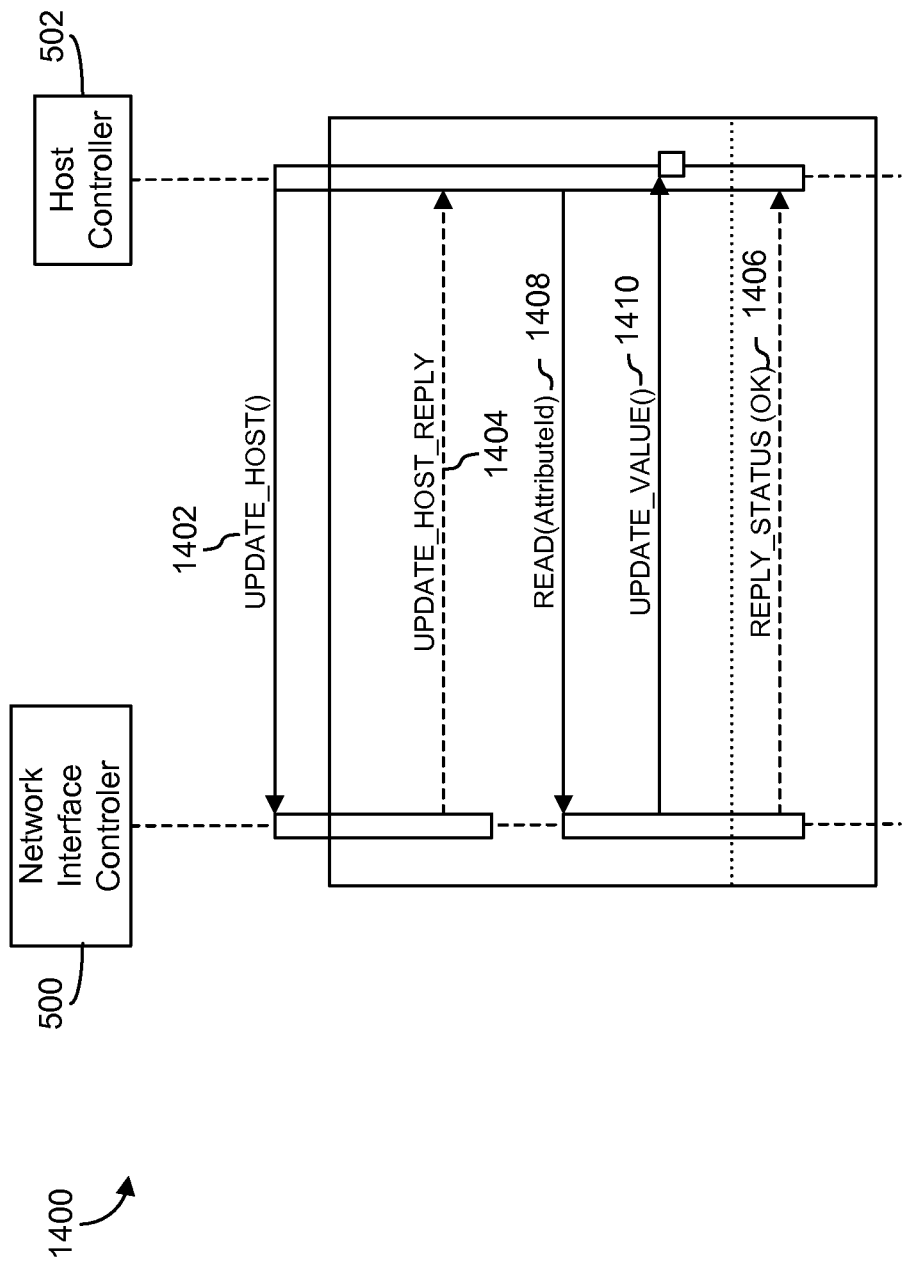
FIG. 14 is a sequence diagram illustrating a data transfer process, according to some embodiments.

Turning now to FIG. 14, a data transfer process 1400 for transferring data between a network interface controller 500 and a host controller 502 is shown, according to some embodiments. In one embodiment, the data transfer process 1400 is used to write data received by the network interface controller 500 from an external network, such as network 512. For example, the external network may be a BACnet network. However, other external networks are contemplated. In one embodiment, the data transfer process can be initiated after the startup sequence 1300 described in FIG. 13 has been completed.

In one embodiment, the host controller 502 periodically initiates an "Update_Host" command 1402 to be sent to the network interface controller 500. The Update_Host command 1402 can be used to request any updated attributes within the network interface controller 500 be communicated to the host controller 502. In one embodiment, the updated attributes can be updated attributes within an equipment object of the network interface controller 500. In other examples, the updated attributes can be attributes of other data objects, such as the standard BACnet objects discussed above. The network interface controller 500 may reply to the host controller 502 with either an "Update_Host Reply" command 1404 or a "Reply_Status" command 1406, which are described in more detail below. In one example, the Update_Host command 1402 may act as a heartbeat signal due to its periodic initiation.

The Update_Host Reply command 1404 can be transmitted to the host controller 502 along with one or more attributes that have changed. In one embodiment, the Update_Host Reply command 1404 includes an attribute ID of the attribute that has changed. The host controller 502, receiving an Update_Host Reply command 1404 with a changed attribute may respond with a "Read Value" command 1408 to the network interface controller 500 to request the new attribute data. In response, the network interface controller 500 may respond to the Read Value command 1408 with either an "Update_Value" command 1410 containing the new data value for the attribute, or the Reply_Status command 1406. In one embodiment, the Reply_Status command 1406 is transmitted to the host controller 502 from the network interface controller 500 where the changed attribute value is unable to be provided to the host controller 502. The Reply_Status command 1406, in response to the Read Value command 1408 may reply with one or more status values. In one example, the status value can be a CRC ERROR value. The CRC ERROR value can indicate that there was a problem with the Read Value command 1408, and instruct the host controller 502 to repeat the Read Value command 1408. Other example status values returned in the Reply_Status command 1406 can include an "Attribute_ID_Not_Found" value. The Attribute_ID_Not_Found value may signal to the host controller 502 that there is a software problem preventing the host controller 502 from being read. In one embodiment, if the host controller 502 does not issue the Read Value command 1408, the network interface controller 500 will resend the Update_Host Reply 1404 containing the unread attribute value in response to a subsequent Update_Host command 1402. In a further embodiment, the host controller 502 will continue to transmit the Read Value command 1408 to the network interface controller 500 to request a read of the specified attribute. For example, the host controller 502 may re-transmit the Read Value command 1408 if a response is not received from the network interface controller 500 after a pre-determined time. In one embodiment, the predetermined time is two seconds. However, predetermined times of more than two seconds or less than two seconds are also considered. In one embodiment, the network interface controller 500 will not send any data again to the host controller 502 until it is requested again by the host controller 502.

Where the network interface controller 500 replies to the Update_Host command 1402 with the Reply_Status command 1406, the Reply_Status command 1406 may include one or more status values within the command. For example, the Reply_Status command 1406 may include one or more of the reply status messages listed in Table 4, above.

Figure 15:
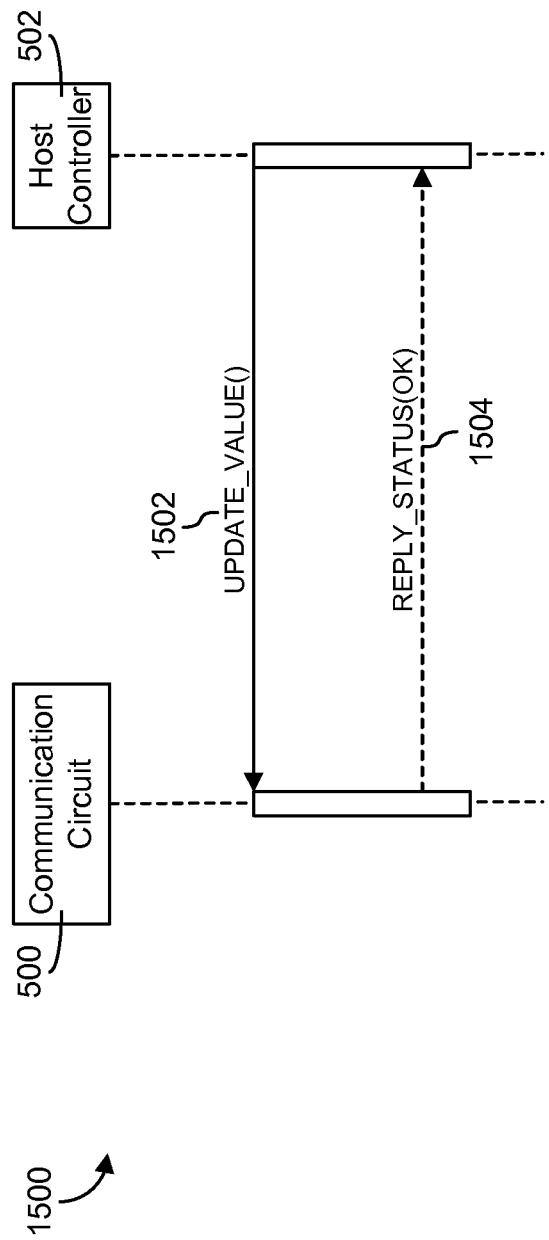
FIG. 15 is a sequence diagram illustrating a host to communication circuit update process, according to some embodiments.
Figure 16:
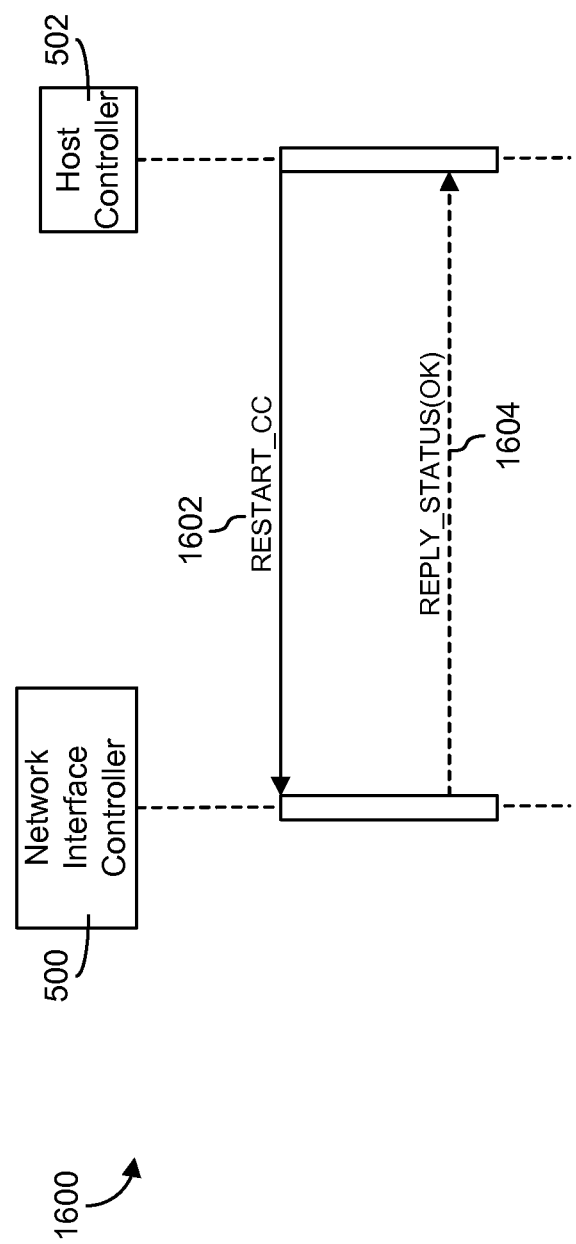
FIG. 16 is a sequence diagram illustrating a network interface controller reset process, according to some embodiments.

Turning now to FIG. 15, a host to communication circuit update process 1600 is shown, according to some embodiments. A host controller 502 may require an updated value from a network interface controller 500, as shown in FIG. 16. The host controller 502 may send an "UPDATE_VALUE" command 1502 to send the new value to the network interface controller 500. In reply to the UPDATE_VALUE command 1502, the network interface controller 500 may return a REPLY_STATUS command 1504. The REPLY STATUS command 1504 can include reply status messages, such as those listed in Table 4, above.

Turning now to FIG. 16, a network interface controller restart process 1600 is shown, according to some embodiments. The network interface controller restart process 1600 may be initiated by a host controller 502 and processed by a network interface controller 500. In one embodiment, the process 1600 is initiated when the host controller 502 is restarting itself. Alternatively, the process 1600 can be initiated when an error in the communication between the host controller 502 and the network interface controller 500 is detected. The host controller 502 may shut off a communication interface to the network interface controller 500 prior to restarting. In one embodiment, the host controller 502 issues a "RESTART CC" command 1602 to the network interface controller 500. The network interface controller 500 may respond with a REPLY_STATUS command 1604 including a reply status message, such as those listed in Table 4, above. Where the network interface controller 500 responds with an "OK" reply status message, the network interface controller 500 has received the command, and will restart after a predetermined delay. In one embodiment, the predetermined delay is five seconds. However, predetermined delays of more than five seconds, or less than five seconds are contemplated.

Figure 17:
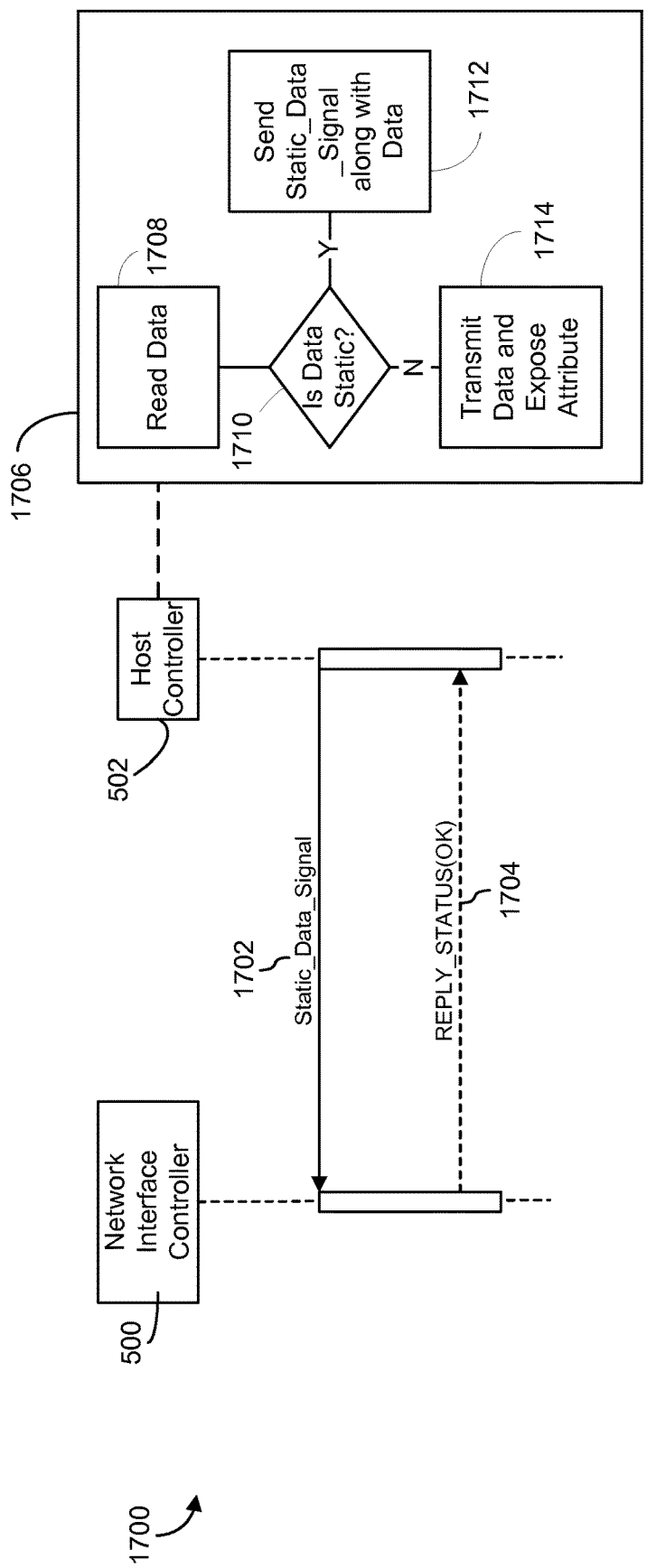
FIG. 17 is a sequence diagram illustrating a static data communication process, according to some embodiments.

Turning now to FIG. 17, a static data communication process 1700 is shown, according to some embodiments. The static data communication process 1700 may be initiated by the host controller 502, and processed by the network interface controller 500. In one embodiment, the process 1700 is initiated when the host controller 502 transmits data to the communication controller that is static or "not real" data. Example, static data may include data packets transmitted by the host controller that do not include any data related to the host controller 502, such as various headers, status checks, heartbeats, etc., which are used by the native host controller 502 applications, but are not desired or interpretable by the network interface controller 500. In one embodiment, the host controller 502 is configured to transmit a "Static_Data_Signal" 1702 to the communication circuit to indicate that static data is about to be transmitted. In alternate embodiments, the Static_Data_Signal 1702 can be sent after the static data has been transmitted to the network interface controller 500. The Static_Data_Signal 1702 may be interpreted by the network interface controller 500 to ensure that the network interface controller 500 does not try to process the static data, which could result in an error being generated. In some embodiments, the Static_Data_Signal 1702 may include information, such as the duration and/or length of the static data being transmitted by the host controller 502. The network interface controller 500, receiving the Static_Data_Signal 1702 may respond with a REPLY_STATUS command 1704 including a reply status message, such as those listed in Table 4, above. In still further embodiments, the Static_Data_Signal 1702 may be one or more data headers that can be interpreted by the integration task module 530 as indicating static data. The integration task module 530 may then prohibit any data following the interpreted Static_Data_Signal 1702 from being written into the equipment object 528. The integration task module 530 may continue to prohibit data received from the host controller 502 from being written to the network interface controller 500 until a subsequent signal indicating actual data is received, such as those described in Tables 2-4. Where the Static_Data_Signal 1702 is comprised of one or more data headers that can be interpreted by the integration task module 530 as indicating static data, the network interface controller 500 may not provide a REPLY_Status command 1704. However, in some embodiments, the REPLY_STATUS command 1704 may be provided to the host controller 502 to indicate that the transmitted data was received by the network interface controller 500.

In some embodiments the host controller 502 may execute a static data determination process 1706 as shown in FIG. 17. The host controller 502 may first read the data at process block 1708 that is being transmitted to the communications circuit to determine what the data is associated with. The host controller 502 may then determine if the data is static data at process block 1710. If the data is determined to be static data, the Static_Data_Signal 1702 may be transmitted to the network interface controller 500 at process block 1712. Where the host controller 502 determines that the data is not static data, the data is transmitted to the communication circuit at process block 1714, allowing the network interface controller 500 to expose the associated attribute in the equipment object 528 to the BACnet objects 540. In some embodiments, the process 1706 is performed for all data points during initial setup to prevent unnecessary static data from being provided to a user via the data objects 540.

Figure 18:
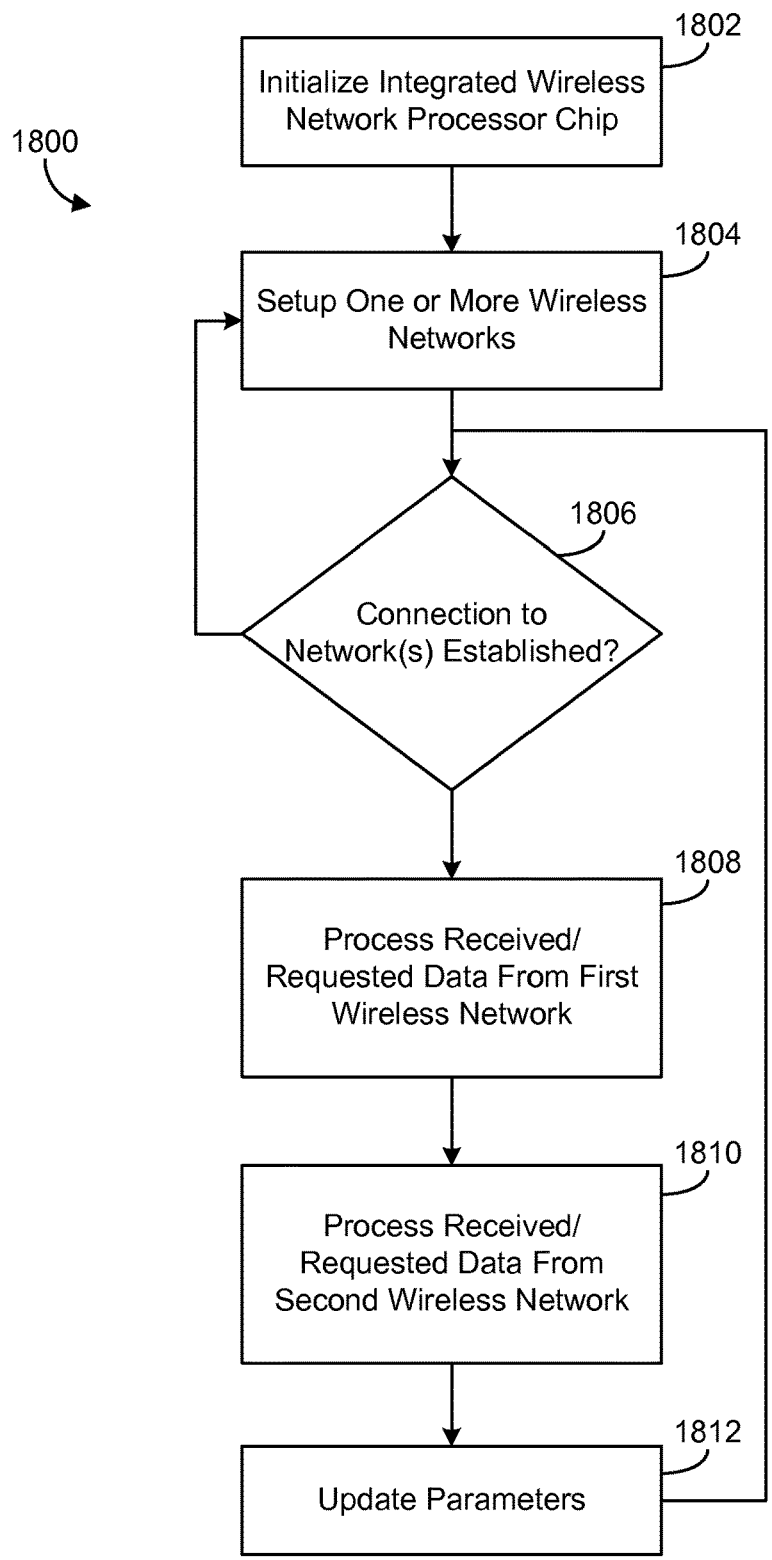
FIG. 18 is a flow chart illustrating a process for establishing a communication network using the network interface controller of FIG. 5, according to some embodiments.

Referring now to FIG. 18, a process 1800 for establishing a communication network using the network interface controller 500 is shown, according to one embodiment. At process block 1802, the network interface controller 500 is initialized. In one embodiment, initializing the network interface controller 500 includes initialization of the processor 508, one or more timers, and one or more inputs and outputs (I/O). In some examples, the I/O can be general purpose (GPIO) points on the network interface controller 500. The I/O can further be dedicated I/O, such as digital, analog, etc. In one embodiment, the initialization process 1802 can be initiated during a power-up period of the network interface controller 500. At process block 1804 the network interface controller 500 can setup one or more wireless networks. For example, the network interface controller 500 may setup a first network for communication with a number of BMS devices over an internal network, such as an BACnet network, an MSTP network, a Wi-Fi network, or other wireless networks for communication with one or more BMS devices. In other examples, the network interface controller 500 could set up a general communication network for communication to other devices, such as routers, controllers (e.g. BMS controllers), mobile devices, etc. In one embodiment, the network interface controller 500 creates a JSON and/or RESTful JSON network for communication with mobile devices. However, other networks, such a Zigbee, LoRA, LAN, TCP/IP, Wi-Fi, etc. can further be setup by the network interface controller 500 as applicable.

At decision block 1806, the network interface controller 500 can determine if it is connected to the one or more wireless networks that the network interface controller 500 set up at process block 1804. In one embodiment, the network interface controller 500 transmits a test message to the one or more networks requesting a response from the networks. In other examples, the network interface controller 500 may passively monitor the networks for transmissions made by other devices on the networks to determine if the network interface controller 500 is connected to the network. However, other methods of determining if the network interface controller 500 is connected to one or more networks are contemplated. If the network interface controller 500 determines that it is not connected to the one or more networks set up in process block 1804, the process 1800 can return to process block 1804 to attempt to setup one or more of the networks again to connect the network interface controller 500 to the desired networks. In one embodiment, the process 1800 can attempt to connect the network interface controller 500 to the network for a predetermined amount of time. If the network interface controller 500 is not able to connect to one or more of the networks by the expiration of the predetermined time, the process 1800 may time out. In some examples, the predetermined amount of time can be about ten seconds; however, predetermined amounts of time greater than ten seconds and less than ten seconds are also considered. In other embodiments, the process 1800 can attempt to connect the network interface controller 500 to the networks for a predetermined number of attempts. If the network interface controller 500 is not able to connect to one or more of the networks in the predetermined number of attempts, the process 1800 may time out. In some examples, the predetermined number of attempts can be ten attempts; however, more than ten attempts or less than ten attempts are also considered. The network interface controller 500 may provide a notification or alert to a user. For example, an illumination device such as an LED on the network interface controller 500 may flash in a sequence or pattern to indicate that the process had timed out.

If the process 1800 determines that connection to the one or more networks has been established at process block 1806, the process 1800 can proceed to process block 1808. At process block 1808, the network interface controller 500 can process data requested or received on a first network. For example, the network interface controller 500 may receive a request for a status of one device from a separate device on the first network. The process 1800 can then proceed to process block 1810, where the network interface controller 500 can process data requested or received on a second network, if applicable. Once the data has been processed in process blocks 1808 and 1810, the network interface controller 500 can update parameters at process block 1812. In one embodiment, the network interface controller 500 can update the I/O based on the processed data. In other examples, the network interface controller 500 can provide updated parameters to other devices connected to the one or more networks, based on the processed data. The process 1800 can then return to process block 1806 to verify the connection to the one or more networks and continuing to process data from the one or more networks.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted.

Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system (BMS) network interface device comprising:
   a processing circuit configured as a system on a chip having a first layer for equipment object data values and a second layer for external network objects, the processing circuit comprising:
      a processor;
      a memory;
      a device interface configured to provide a serial communication link between the network interface device and a host controller of an HVAC device; and
      a network interface in communication with the device interface and configured to communicate with an external network;
   wherein the device interface is configured to receive equipment object data values from the host controller, the device interface being configured by the processing circuit to populate one or more attributes of an equipment object stored in the memory with the equipment object data values;
   wherein the network interface is configured to map the attributes of the equipment object to individual network data objects for the external network, and write the attributes of the equipment object to the mapped individual network data objects, the network interface being configured to communicate the individual network data objects to the external network;
   wherein the processing circuit is further configured to execute control logic to control operation of the HVAC device based in part on device data received from the HVAC device via the device interface and one or more commands received from the external network.

2. The network interface device of claim 1, wherein the external network is a BACnet network.

3. The network interface device of claim 1, wherein the device interface comprises a network layer, the network layer configured to read values contained in the individual network data objects, and transmit the values contained in the individual network data objects to the external network.

4. The network interface device of claim 1, wherein the network interface comprises a Wi-Fi protocol module for communicating with a Wi-Fi network via a wireless radio on the device.

5. The network interface device of claim 4, wherein the Wi-Fi protocol module comprises a cryptography engine.

6. The network interface device of claim 1, wherein the network interface selectively maps a set of the attributes of the equipment object to the individual network data objects, based on an instruction from the processing circuit.

7. The network interface device of claim 1, wherein the control logic executes one or more control algorithms to determine values associated with one or more data points of the HVAC device.

8. The network interface device of claim 7, wherein the network interface is configured to write the determined values to their associated attributes in the equipment object.

9. The network interface device of claim 1, wherein the processing circuit is installed locally on the HVAC device.

10. A communication circuit for providing network communications and control to an HVAC device, the communication circuit comprising:
   a processing circuit, the processing circuit comprising:
      a processor, the processor configured to communicate with the HVAC device, and configured to receive one or more data values from the HVAC device via a serial connection to a host controller of the HVAC device;
      a memory, the memory in communication with the processor and including an equipment object, the equipment object comprising one or more attributes associated with the HVAC device, wherein the processing circuit is configured to map the one or more received data values to the one or more attributes of the equipment object, and wherein the processing circuit is further configured to map the attributes of the equipment object to individual data objects that are specific to a protocol associated with an external network;
      a network transceiver, the network transceiver configured to transmit the individual data objects to the external network using a communication interface; and
      a control logic module configured to provide control algorithms to the processor for execution, wherein the control algorithms are configured to control one or more variables associated with the HVAC device;
   wherein the communication circuit is installed locally on the HVAC device.

11. The communication circuit of claim 10, wherein the network transceiver is a wireless radio.

12. The communication circuit of claim 10, wherein the HVAC device is a chiller, an actuator, a boiler, or an air handling unit (AHU).

13. The communication circuit of claim 10, wherein the individual data objects include at least one of file objects, device objects, analog values, binary values and multistate values.

14. The communication circuit of claim 10, wherein the processing circuit is further configured to receive data values from the external network, and write the received data values to one or more of the individual network data objects.

15. The communication circuit of claim 10, wherein the processing circuit further comprises a Wi-Fi protocol module configured to transmit data over the network transceiver using Wi-Fi communication.

16. A method of enabling communication between an HVAC device and an external network, the method comprising:
   providing a communication and control circuit with the HVAC device, the communication and control circuit comprising a processor and a memory;
   receiving one or more data values associated with the HVAC device at the communication and control circuit via a serial communication link between the communication and control circuit and the HVAC device;
   writing the one or more data values to attributes of an equipment object stored in the memory of the communication and control circuit;
   mapping the attributes of the equipment object to one or more individual network data objects for the external network; and
   wirelessly transmitting the individual network data objects to the external network using a Wi-Fi communication link between the communication and control circuit and the external network.

17. The method of claim 16, wherein the external network is a BACnet network.

18. The method of claim 16, wherein the individual network data objects include at least one of file objects, device objects, analog values, binary values and multistate values.

19. The method of claim 16, wherein the serial communication link is a universal asynchronous receiver/transmitter (UART) interface.

20. The method of claim 16, further comprising:
wirelessly receiving a set point command from the external network;
executing a control algorithm to generate one or more data values required to achieve the set point; and
writing the one or more values to associated attributes of the equipment object.

* * * * *